(12) United States Patent
Song et al.

(10) Patent No.: US 12,026,441 B2
(45) Date of Patent: Jul. 2, 2024

(54) MULTI-DISCIPLINARY OPTIMIZATION-ENABLED DESIGN AUTOMATION AND OPTIMIZATION FOR PRESSURE-CONTROLLING COMPONENTS

(71) Applicant: Schlumberger Technology Corporation, Sugar Land, TX (US)

(72) Inventors: Fei Song, Sugar Land, TX (US); Ke Ken Li, Sugar Land, TX (US); Caroline Stephan Rivas, Houston, TX (US); Konstantin Bieneman, Simpsonville, SC (US); Thomas Yap, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 577 days.

(21) Appl. No.: 17/307,591

(22) Filed: May 4, 2021

(65) Prior Publication Data
US 2021/0342507 A1 Nov. 4, 2021

Related U.S. Application Data

(60) Provisional application No. 63/019,742, filed on May 4, 2020.

(51) Int. Cl.
*G06F 30/23* (2020.01)
*E21B 33/06* (2006.01)
*G06F 119/18* (2020.01)

(52) U.S. Cl.
CPC .............. *G06F 30/23* (2020.01); *E21B 33/06* (2013.01); *E21B 2200/20* (2020.05); *G06F 2119/18* (2020.01)

(58) Field of Classification Search
CPC ...... G06F 30/23; G06F 2119/18; E21B 33/06; E21B 2200/20
See application file for complete search history.

(56) References Cited

U.S. PATENT DOCUMENTS

2020/0089824 A1\* 3/2020 Linehan ................ G05B 13/04

FOREIGN PATENT DOCUMENTS

WO WO 2013/192247 A1 \* 6/2013 ............... G06F 9/38

OTHER PUBLICATIONS

Gray JS, Hwang JT, Martins JR, Moore KT, Naylor BA. OpenMDAO: An open-source framework for multidisciplinary design, analysis, and optimization. Structural and Multidisciplinary Optimization. Apr. 15, 2019;59:1075-104. (Year: 2019).\*

(Continued)

*Primary Examiner* — Chuen-Meei Gan
(74) *Attorney, Agent, or Firm* — Jeffrey D. Frantz

(57) ABSTRACT

A multi-disciplinary optimization (MDO) framework and workflow facilitates analysis and optimization of set of designs of a pressure-controlling component. The MDO workflow generally enables design workflow integration and automation, which can improve engineering efficiency, and enables automated optimization within the workflow automation, which facilitates performance and reliability improvement for product development. The MDO workflow enables the integration of computer-aided design (CAD), finite element analysis (FEA), digital manufacturing simulation (DMS), and optimization packages to facilitate testing and optimization of a set of pressure-controlling component designs. As such, the MDO framework and workflow improve the efficiency of the design process by providing a scalable solution for automating aspects of the design process for a set of designs of a pressure-controlling compo- (Continued)

nent, which may represent a product family or a set of competing alternative designs.

12 Claims, 19 Drawing Sheets

(56) References Cited

OTHER PUBLICATIONS

Bzymek, Z.M. and Benjamin, A., 2014, November. Design, Machining and Production Integration Problems in Manufacturing Automation. In ASME International Mechanical Engineering Congress and Exposition (vol. 46507, p. V005T05A050). American Society of Mechanical Engineers. (Year: 2014).*
Song F, Li K, Stephan Rivas C, Bieneman K, Yap T. Multidisciplinary Optimization-Enabled Design Automation and Optimization for Blowout Preventer Pipe Rams. InASME International Mechanical Engineering Congress and Exposition Nov. 1, 20206 (vol. 84539, p. V006T06A040). American Society of Mechanical Eng (Year: 2020).*
Vujasinovic, A. N., "How Blowout Preventers Work", SPE Journal Paper 15795-PA, Journal of Petroleum Technology, 1986, 38(9), pp. 935-937.
Kratschmer, D. et al., "Democratization of CAE-Workflows with OptiSlang at Bosch", presented at the The 16th Weimar Optimization and Stochastic Days, 2019, 31 pages.
Nicholson, J. C. et al., "Multi-Objective Structural Optimization of Wind Turbine Tower and Foundation Systems using Isight: A Process Automation and Design Exploration Software", presented at the 10th World Congress on Structural and Multidisciplinary Optimization, Orlando, Florida, USA, 2013, 10 pages.
Abvabi, A. et al., "An Inverse Routine to Predict Residual Stress in Sheet Material", Materials Science and Engineering: A, 2016, 652, pp. 99-104.
Gray, J. S. et al., "OpenMDAO: An Open-Source Framework for Multidisciplinary Design, Analysis, and Optimization" Structural and Multidisciplinary Optimization, 2019, 59, pp. 1075-1104.
Touloupaki, E. et al., "Performance Simulation Integrated in Parametric 3D Modeling as a Method for Early Stage Design Optimization—A Review", Energies, 2017, 10(5), 18 pages.
Merkel, M. et al., "An Automated Optimization Process for a CAE Driven Product Development", Journal of Mechanical Design, 2003, 125(4), pp. 694-700.
Bzymek, Z. M. et al., "Design, Machining and Production Integration Problems in Manufacturing Automation", IMECE2014-38355, 2014, presented at the ASME International Mechanical Engineering Congress and Exposition, 9 pages.
Van Gent, G. et al., "Formulation and integration of MDAO systems for collaborative design: A graph-based methodological approach", Aerospace Science and Technology, 2019, 90, pp. 410-433.
"The Python's Standard Library." 2019, available at https://docs.python.org/3/library, 8 pages.
Apriori Resources, "aPriori Cost Guide." 2014. available at: https://resources.apriori.com/vidyard-all-players/ priori-cost-guide-2.
"Specification for Drill-through Equipment." ANSI/API Specification 16A, Fourth Edition, Apr. 2016, pp. 37-38.
ASME International, ASME Boiler and Pressure Vessel Code, Section VIII, Division 2., "Part 5: Design by Analysis Requirements", 2017, pp. 575-679.
Autodesk.com, "Professional-grade 3D CAD software for product design and engineering," 2019, available at https://www.autodesk.com/products/inventor/overview?term=1-YEAR, 13 pages.

* cited by examiner

MULTI-DISCIPLINARY OPTIMIZATION-ENABLED DESIGN AUTOMATION AND OPTIMIZATION FOR PRESSURE-CONTROLLING COMPONENTS

CROSS-REFERENCE TO RELATED APPLICATION

This application claims priority to and the benefit of U.S. Provisional Application No. 63/019,742, entitled "MULTI-DISCIPLINARY OPTIMIZATION-ENABLED DESIGN AUTOMATION AND OPTIMIZATION FOR BLOWOUT PREVENTER PIPE RAMS" and filed May 4, 2020, which is incorporated by reference herein in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A blowout preventer (BOP) is installed on a wellhead to seal and control an oil and gas well during various operations. For example, during drilling operations, a drill string may be suspended from a rig through the BOP into a wellbore. A drilling fluid is delivered through the drill string and returned up through an annulus between the drill string and a casing that lines the wellbore. In the event of a rapid invasion of formation fluid in the annulus, commonly known as a "kick," the BOP may be actuated to seal the annulus and to contain fluid pressure in the wellbore, thereby protecting well equipment positioned above the BOP.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
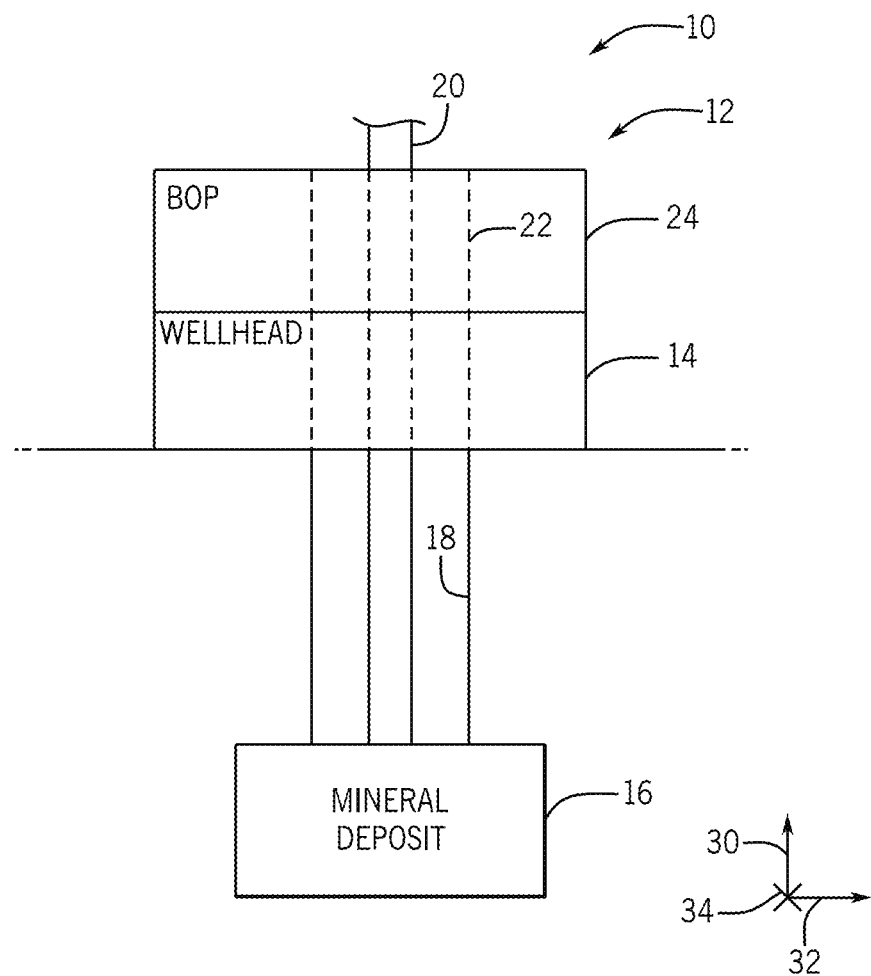
FIG. 1 is a block diagram of a drilling system for mineral extraction, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A blowout preventer is a large valve that encases an oil well on the surface. During operation, the valve may be closed while drilling if overpressure from a reservoir causes formation of fluids, such as oil and natural gas, to back up within the wellbore. A pipe ram is an important component of the BOP system, as the pipe ram is designed to seal around a drill pipe to restrict the flow in an annulus defined between an outside of the drill pipe and the wellbore. When a pipe ram is being designed, it is typically designed as part of a product family of pipe rams having different configurations to suit a variety of drill pipe sizes. For example, within a pipe ram product family, there may be more than one hundred different pipe ram designs to accommodate a wide variety of different drill pipe sizes.

To assure their structural integrity under service loads, pipe rams are typically designed to meet one or more standards, such as the stress requirements per the American Petroleum Institute (API) Specification 16A and ASME (American Society of Mechanical Engineers) Boiler and Pressure Vessel Code Section VIII, Division 2. With a conventional manual design workflow, considerable time and effort is expended to test all the designs of the product family for compliance with the relevant standards. Therefore, to improve the efficiency of the design process, it is presently recognized that it would be beneficial to have a scalable solution for testing entire product families or an entire set of alternative designs of a pressure-controlling component.

With the foregoing in mind, present embodiments are directed to a multi-disciplinary optimization (MDO) workflow to facilitate analysis and optimization of a set of designs of a pressure-controlling component. The MDO workflow generally enables design workflow integration and automation, which can improve engineering efficiency, and enables automated optimization within the workflow automation, which facilitates performance and reliability improvement for product development. The disclosed MDO workflow generally enables multi-code integration, computer-aided engineering (CAE) workflow automation, optimization, and design-space exploration. More specifically, the MDO workflow enables the integration of computer-aided design (CAD), finite element analysis (FEA), digital manufacturing simulation (DMS), and optimization packages to facilitate testing and optimization of a set of pressure-controlling component designs. In certain embodiments, the set of designs may represent at least a portion of product family of pressure-controlling components having the same general design or feature, but having different dimensions and/or geometries to accommodate drilling pipes of different sizes. In other embodiments, the set of designs may represent a set of alternative pressure-controlling component designs that are being evaluated to determine which design should be selected for further development based on one or more objectives (e.g., minimized material cost; minimized manufacturing cost; maximized performance; maximized operational lifetime).

To facilitate discussion, the MDO technique is described in the particular context of design and testing of pipe rams of a BOP. However, it should be appreciated that the systems and methods described herein may be adapted for the design and testing of other pressure-controlling components or equipment, such as another component of the BOP for the drilling system and/or another component of another device for any type of drilling system. For example, in certain embodiments, the MDO technique set forth herein may be applied to evaluate and optimize sets of designs of other types of rams, including shear rams and variable-bore rams.

As discussed below, the MDO workflow generally involves a MDO system that orchestrates the design and analysis of a set of pressure-controlling component designs. The MDO system receives a master template from a CAD system, wherein the master template is parametrized to represent an entire set of pressure-controlling component designs. The MDO system provides the master template and one or more operational conditions as input to a FEA system to perform simulated testing of the designs of the master template. The FEA system automatically generates a corresponding FEA model for each design/operational condition combination, uses these FEA models to simulate operation of each design in each operational condition, and performs post-processing of the results of these simulations to determine pass-fail statuses. The MDO system also provides the master template and information regarding one or more manufacturing materials to a DMS system. The DMS system automatically performs an analysis of the manufacturability and a predicted cost associated with each design of the master template using the one or more material options and/or one or more tolerances. The MDO system receives results from the FEA system and the DMS system, and provides these results to a report system. The report system receives the results, analyzes the results of FEA simulation and DMS analysis for each design, and prepares suitable reports for each design of the master template. For example, the reports may include FEA reports indicating the pass-fail status of each design in each operational condition, and DMS reports indicating the fully burdened cost of manufacturing each design in one or more materials and at one or more different tolerances. In certain embodiments, such as when the master template includes a set of alternative designs to be evaluated, the report system may rank the designs of the master template based on one or more objectives. For example, the report system may rank the designs of the master template based on the pass-fail statuses of each design indicated in the FEA results, based on minimizing and manufacturing cost indicated in the DMS reports, or any other suitable manufacturing objective.

With the foregoing in mind, the MDO technique substantially enhances efficiency and consistency in performing FEA modeling, performing DMS modeling, and producing reports based on these analyses. The MDO technique also enables automatic comparison of designs based on simulated operational performance and predicted manufacturing cost, which enables an efficient design and optimization process for pressure-controlling components. As such, embodiments of the MDO technique significantly improve the performance and reliability of pressure-controlling components, while also minimizing development and production costs.

With the foregoing in mind, FIG. 1 is a block diagram of an embodiment of a mineral extraction system 10. The mineral extraction system 10 may be configured to extract various minerals and natural resources, including hydrocarbons (e.g., oil and/or natural gas), from the earth and/or to inject substances into the earth. The mineral extraction system 10 may be a land-based system (e.g., a surface system) or an offshore system (e.g., an offshore platform system).

As shown, a BOP stack 12 may be mounted to a wellhead 14, which is coupled to a mineral deposit 16 via a wellbore 18. The wellhead 14 may include or be coupled to any of a variety of other components such as a spool, a hanger, and a "Christmas" tree. The wellhead 14 may return drilling fluid or mud toward a surface during drilling operations, for example. Downhole operations are carried out by a conduit 20 (e.g., drill string) that extends through a central bore 22 of the BOP stack 12, through the wellhead 14, and into the wellbore 18. As discussed in more detail below, the BOP stack 12 may include one or more BOPs 24. To facilitate discussion, the BOP stack 12 and its components may be described with reference to a vertical axis or direction 30, an axial axis or direction 32, and/or a lateral axis or direction 34.

Figure 2:
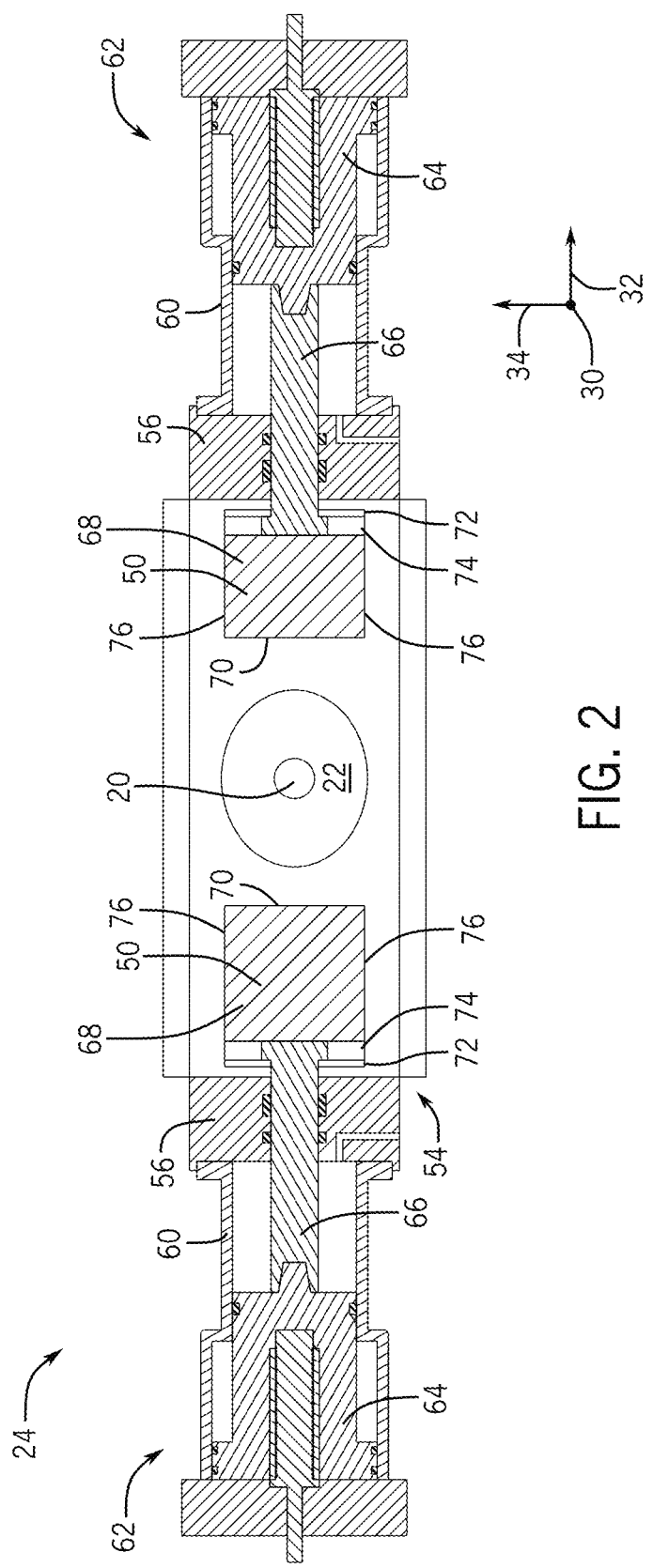
FIG. 2 is a cross-sectional top view of a portion of a blowout preventer (BOP) that may be used in the drilling system of FIG. 1, in accordance with an embodiment of the present disclosure.

FIG. 2 is a cross-sectional top view of a portion of an embodiment of the BOP 24 that may be used in the mineral extraction system 10 of FIG. 1, in accordance with an embodiment of the present disclosure. As shown, the BOP 24 includes opposed rams 50 that are positioned such that the BOP 24 is in an open configuration 54. In the open configuration 54, the opposed rams 50 are withdrawn from the central bore 22, do not contact the conduit 20, and/or do not contact one another.

As shown, the BOP 24 includes a housing 56 surrounding the central bore 22. The housing 56 is generally rectangular in the illustrated embodiment, although the housing 56 may have any cross-sectional shape, including any polygonal shape and/or annular shape. Bonnet assemblies 60 are mounted on opposite sides of the housing 56 (e.g., via threaded fasteners). Each bonnet assembly 60 supports an actuator 62, which may include a piston 64 and a connecting rod 66. The actuators 62 may drive the opposed rams 50 toward one another along the axial axis 32 to reach a closed position in which the opposed rams 50 are positioned within the central bore 22, contact and/or shear the conduit 20 to seal the central bore 22, and/or contact one another to seal the central bore 22.

Each of the opposed rams 50 may include a body 68 (e.g., ram body) that includes a leading surface 70 (e.g., side; portion; wall) and a rearward surface 72 (e.g., side; portion; wall; rearmost surface). The leading surfaces 70 may be positioned proximate to the central bore 22 and may face one another when the opposed rams 50 are installed within the housing 56. The rearward surfaces 72 may be positioned distal from the central bore 22 and proximate to a respective one of the actuators 62 when the opposed rams 50 are installed within the housing 56. The leading surfaces 70 may be configured to couple to and/or support sealing elements (e.g., elastomer elements) that are configured to form a seal to seal the central bore 22 in the closed position, and the rearward surfaces 72 may include an attachment interface 74 (e.g., recess) that is configured to engage with the connecting rod 66 of the actuator 62. The body 68 also includes lateral surfaces 76 (e.g., walls) that are on opposite lateral sides of the body 68 and that extend along the axial axis 32 between the leading surface 70 and the rearward surface 72. In FIG. 2, the opposed rams 50 have a generally rectangular shape to facilitate discussion; however, it should be appreciated that the opposed rams 50 may have any of a variety of shapes or features (e.g., curved portions to seal against the conduit 20; knife edges to shear the conduit 20).

Figure 3:
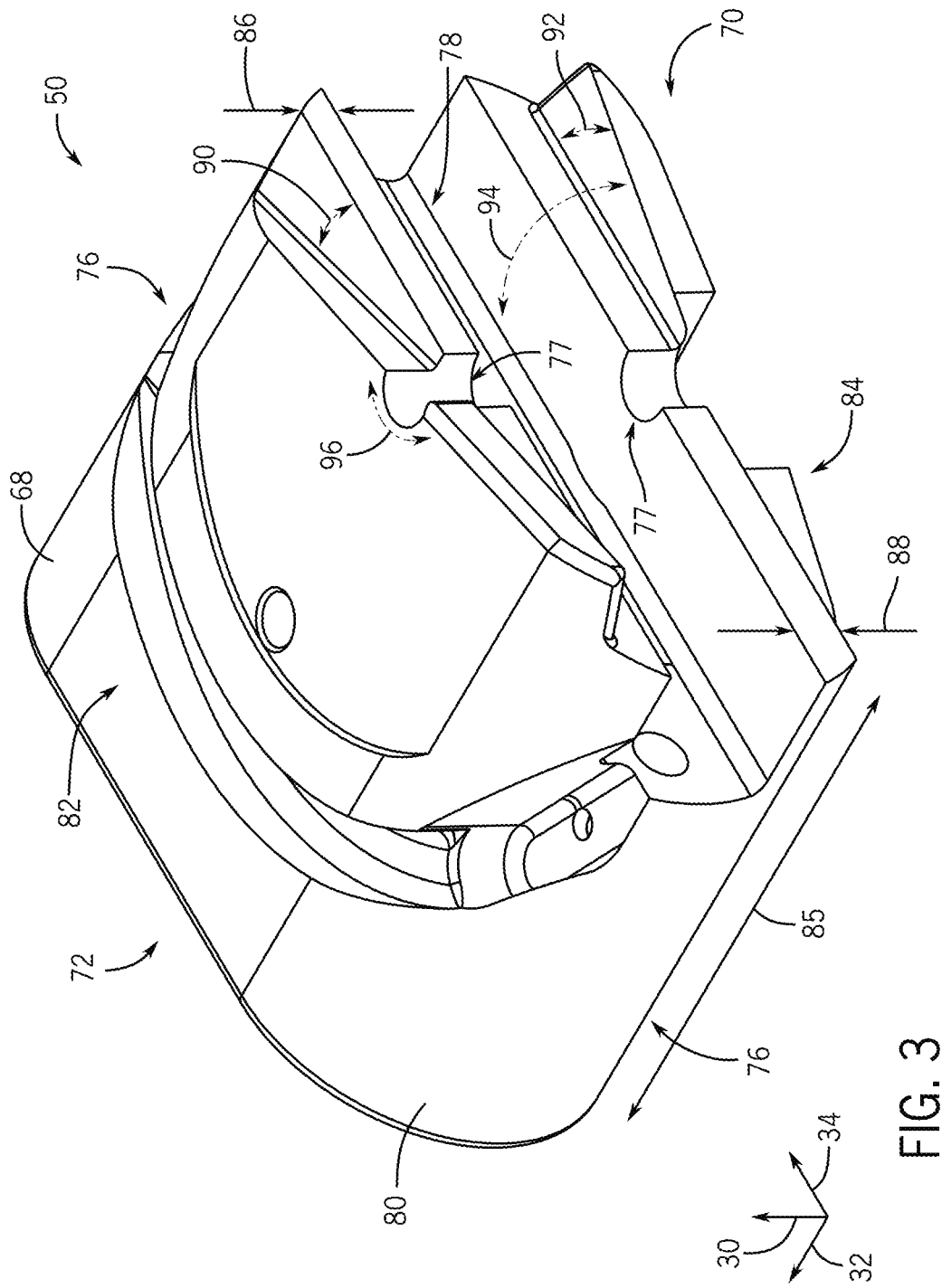
FIG. 3 is a perspective front view of a ram that may be used in the BOP of FIG. 2, in accordance with an embodiment of the present disclosure.
Figure 4:
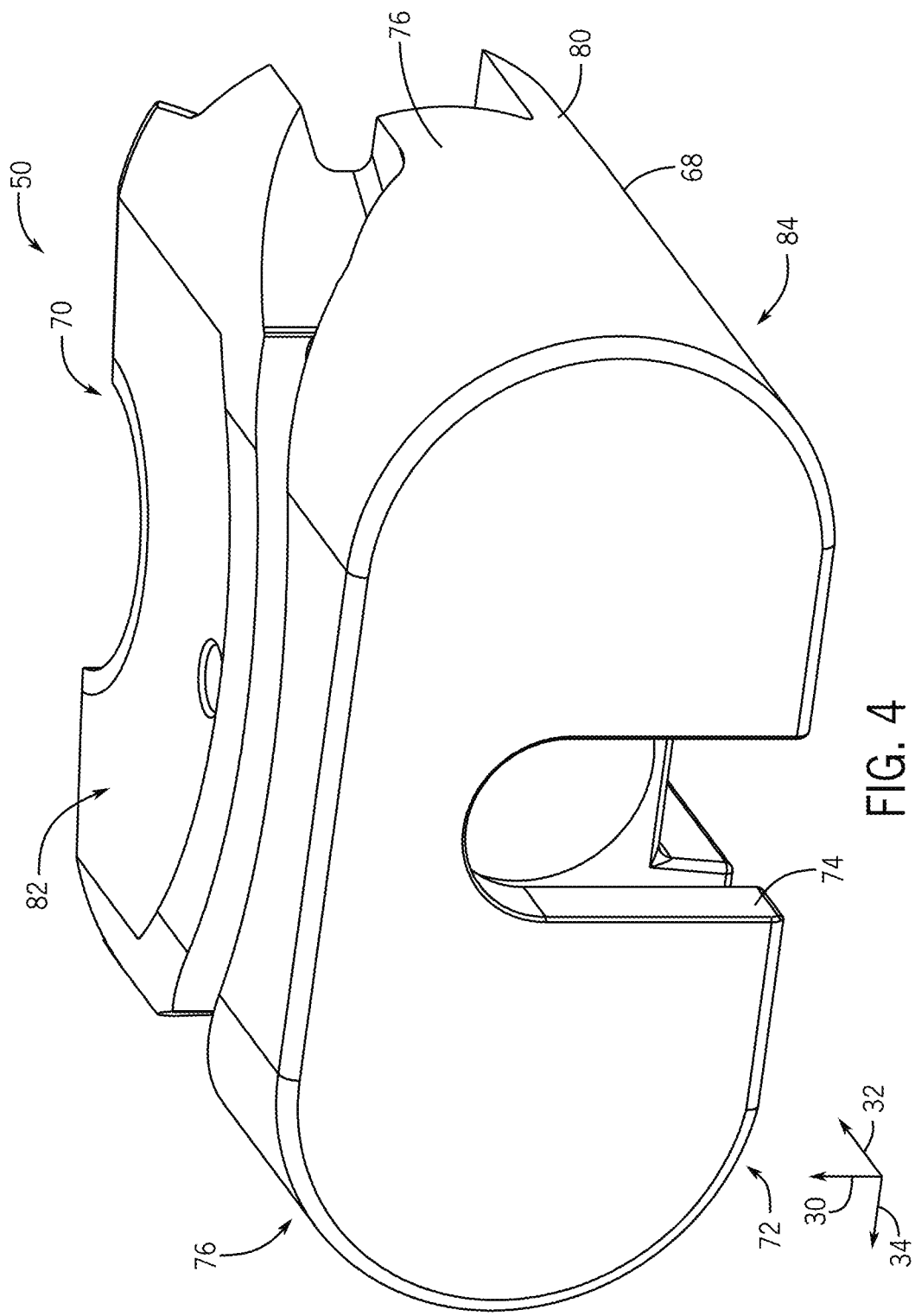
FIG. 4 is a perspective rear view of the ram of FIG. 3, in accordance with an embodiment of the present disclosure.

FIG. 3 is a perspective front view and FIG. 4 is a perspective rear view of an embodiment of one of the opposed rams 50 that may be used in the BOP. As shown, the ram 50 includes the body 68 having the leading surface 70 and the rearward surface 72. The ram 50 in FIGS. 3 and 4 is a pipe ram that includes one or more curved portions 77 formed in the leading surface 70 and that extends along the lateral axis 34 of the ram 50. The curved portions 77 may be configured to couple to and/or support the seal elements that seal against the conduit that extends through the central bore of the BOP. However, it should be appreciated that the ram 50 may have any of a variety of other configurations (e.g., the ram 50 may be a shear ram that includes a knife edge that is formed on the leading surface 70 and that extends along the lateral axis 34 of the ram 50). The ram in FIGS. 3 and 4 also includes leading cutouts 78 formed in the leading surface 70 (e.g., positioned near or between the curved portions 77 along the vertical axis 30). The body 68 may include a solid portion 80 (e.g., block portion; center portion) between the leading surface 70 and the rearward surface 72 along the axial axis 32, between the lateral surfaces 76 along the lateral axis 34, and between a top surface 82 (e.g., top-most surface) and a bottom surface 84 (e.g., bottom-most surface) along the vertical axis 30. The leading surface 70, the rearward surface 72, the lateral surfaces 76, the top surface 82, and the bottom surface 84 may be considered outer surfaces of the ram 50.

Additionally, it may be appreciated that the ram 50 illustrated in FIGS. 3 and 4 may represent a family of related rams of similar design. That is, as the ram 50 is being designed, it may be developed as part of a line or design family of rams 50 having similar general features. For example, within a particular design family of the ram 50, a set of similar rams may be manufactured that have different dimensions to accommodate conduits of different dimensions. For example, as illustrated in FIG. 3, different designs within a design or product family of the ram 50 may have a different length 85 along the axis 32, different thicknesses 86 and 88 of portions of the leading surface 70, different angles 90, 92, or 94 between portions of the leading surface 70, a different distance 96 around (e.g., partial circumference of) the curved portions 77. It may be appreciated that any other suitable dimension of the pressure-controlling component may be varied over a line or family of related pressure-controlling components. For example, a product family of a given pipe ram design may include dozens of designs having different dimensions and/or geometries to handle conduits (e.g., drill pipes) having sizes ranging from about 8.9 centimeters (3.5 inches) to about 16.8 centimeters (6.625 inches).

MDO Framework

Figure 5:
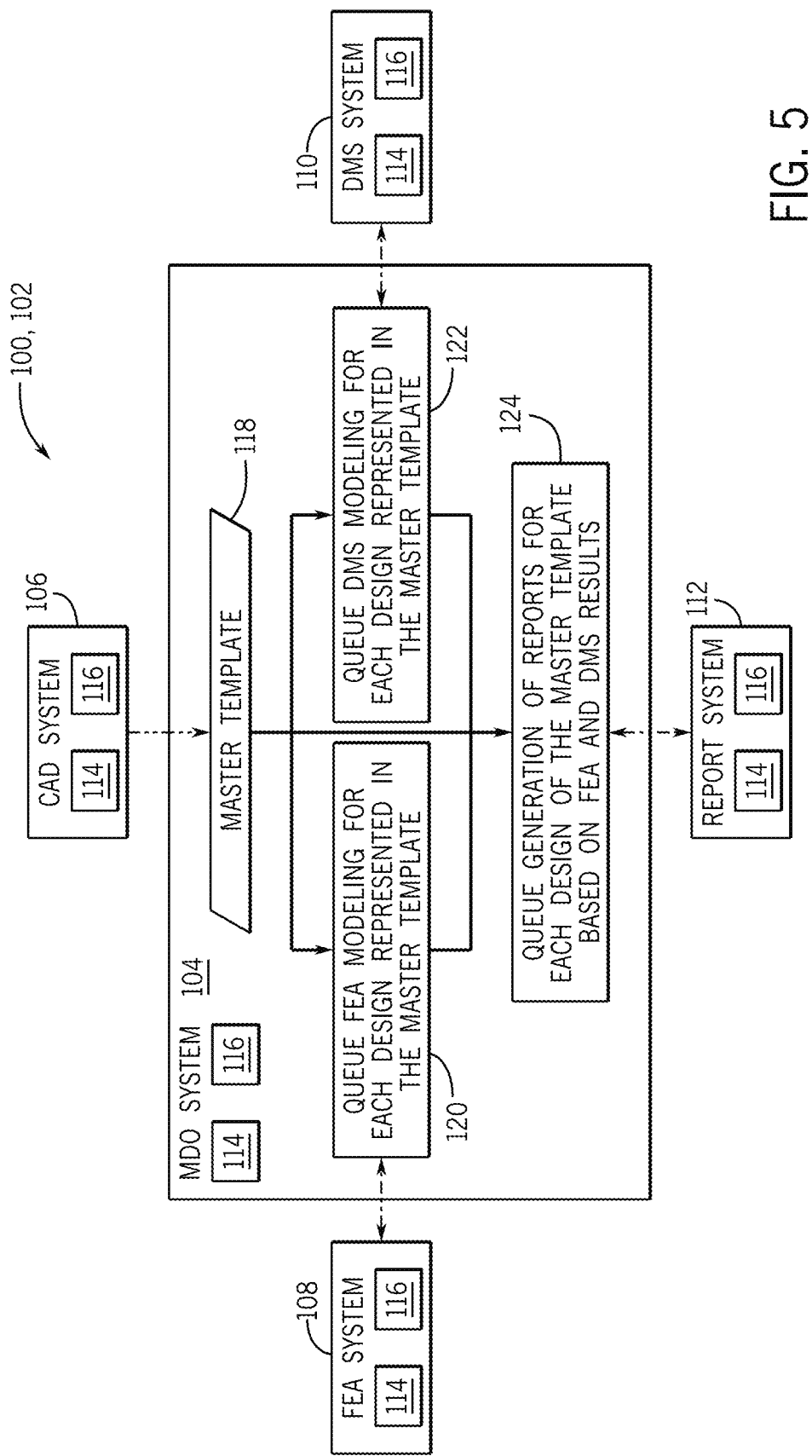
FIG. 5 is a schematic of a multi-disciplinary optimization (MDO) framework, which includes a MDO system that coordinates operation of a computer-aided design (CAD) system, a finite element analysis (FEA) system, a digital manufacturing simulation (DMS) system, and a report system, as part of a MDO workflow, in accordance with an embodiment of the present disclosure.

As noted above, multi-disciplinary optimization (MDO) generally involves integration of multiple software packages utilized in the design process, computer aided engineering (CAE), workflow automation, design-space exploration, and optimization. FIG. 5 illustrates an embodiment of a MDO framework 100, in accordance with embodiments of the present disclosure. As used herein, the term "framework" refers to a collection of software and data resources (e.g., software applications, libraries, databases), as well as hardware resources (e.g., memory circuitry, processing circuitry, networking circuitry), that cooperate to enable a MDO workflow 102 for design automation.

For the embodiment illustrated in FIG. 5, the MDO framework 100 includes a MDO system 104. For the illustrated embodiment, the MDO system 104 coordinates operation of the various systems of the MDO framework 100 to perform the MDO workflow 102. More specifically, the MDO system 104 orchestrates operations between a CAD system 106, a FEA system 108, a DMS system 110, and a report system 112 to perform the MDO workflow 102. For the illustrated embodiment, the MDO system 104, the FEA system 108, the DMS system 110, and the report system 112 each include respective memory circuitry 114 and respective processing circuitry 116. However, in other embodiments, one or more systems of the MDO framework 100 may be hosted on the same computing device (e.g., a common server), and may share memory and/or processing resources.

The memory circuitry 114 of the MDO system 104 may store, and the processing circuitry 116 of the MDO system 104 may execute, a suitable MDO software application to coordinate the activities of the other systems of the MDO framework 100. In certain embodiments, the MDO software application may include, but is not limited to: Optislang™ (available from ANSYS), iSight™ (available from Dassault Systèmes), HEEDS® (available from Siemens Industry Software, Inc.), or OpenMDAO (available from NASA Glenn Research Center). In certain embodiments, the MDO system 104 may be implemented as a collection of customized scripts (e.g., execution requesting scripts; data exchange scripts; optimization scripts) that are executed to coordinate operation of the other systems of the MDO framework 100, which may enable greater efficiency and reduced overhead compared to embodiments that utilize a commercial MDO software application. It may be appreciated that such implementations may enable the disclosed MDO framework 100 and/or MDO workflow 102 to be applied beyond the design stage (e.g., design space exploration and optimization), such that the MDO framework 100 can, additionally or alternatively, be used to model and optimize other aspects of production (e.g., operations). As such, the MDO system 104 enables design workflow integration and automation, which can be used for improving engineering efficiency. Additionally, the MDO system enables automated optimization capability that is built on top of workflow automation, which renders performance and reliability improvement for product development.

The memory circuitry 114 of the FEA system 108 may store, and the processing circuitry 116 of the FEA system 108 may execute, a suitable FEA software application to perform FEA modeling and simulated testing of the designs in different operational conditions. In certain embodiments, the FEA software application may include Abaqus Unified FEA—SIMULIA™ (available from Dassault Systemes), Mechanical Simulation™ (available from ANSYS), Simcenter Nastran™ (available from Siemens Industry Software, Inc.), or another suitable FEA modeling and simulation application. The memory circuitry 114 of the DMS system 110 may store, and the processing circuitry 116 of the DMS system 110 may execute, a suitable DMS software application to perform DMS modeling to determine cost-related information regarding each design represented within the master template 118. In certain embodiments, the DMS software application may include TechniQuote™ (available from CETIM), aPriori™ (available from aPriori, Inc.), a proprietary manufacturability analysis application, or another suitable DMS application.

During operation of the MDO framework 100, the MDO system 104 receives a master template 118 of a pressure-controlling component (e.g., ram 50) from the CAD system 106. An example method whereby the CAD system 106 generates the master template 118 is discussed below with respect to FIG. 6. In general, the master template 118 is a CAD model that has been suitably parameterized to represent an entire set of designs. In certain cases, the master template 118 may represent a product family of designs having similar features, but with different geometries and/or dimensions (e.g., to accommodate different sizes of the conduit 20). In such cases, the MDO framework 100 may be configured to perform FEA modeling and/or DMS modeling to evaluate the performance and cost of each design in the product family represented within the master template 118. In other cases, the master template 118 may include a set of alternative candidate designs with different features. In such cases, the MDO framework 100 may be configured to perform FEA modeling and/or DMS modeling to evaluate the performance and cost of each alternative design represented within the master template 118. Additionally, for such embodiments, the MDO framework 100 may provide a ranked set of the alternative designs based on one or more objectives (e.g., maximizing compliance with a standard, minimizing materials and/or manufacturing costs) to enable automation of aspects of the design process.

After receiving the master template 118 from the CAD system 106, the MDO system 104 automatically queues FEA modeling (block 120) by the FEA system and automatically queues DMS modeling (block 122) by the DMS system 110 for each design represented within the master template 118. An example of a FEA modeling process of the FEA system 108 is discussed with respect to FIG. 7, and an example of a DMS modeling process of the DMS system 110 is discussed with respect to FIG. 14. The MDO system 104 also automatically queues report generation (block 124) for each design represented within the master template 118 based on results generated by the FEA modeling and the DMS modeling. An example of a report generation process is discussed with respect to FIG. 15.

It may be appreciated that embodiments of the MDO framework 100 are highly-distributed for enhanced efficiency. For example, the MDO system 104 enables the FEA modeling and DMS modeling of a particular design to be performed in parallel. Similarly, the FEA system 108 and the DMS system 110 may be configured to simultaneously model more than one design (e.g., all of the designs of the master template 118) in parallel. Furthermore, the MDO system 104 optimizes the exchange of data between the systems of the MDO framework 100, meaning that results from the FEA modeling or DMS modeling of a given design are provided to the report system 112 as they are generated, which enables the report system 112 to immediately being generating reports as soon as the FEA and/or DMS results are provided to the MDO system 104.

Master Template Generation

Figure 6:
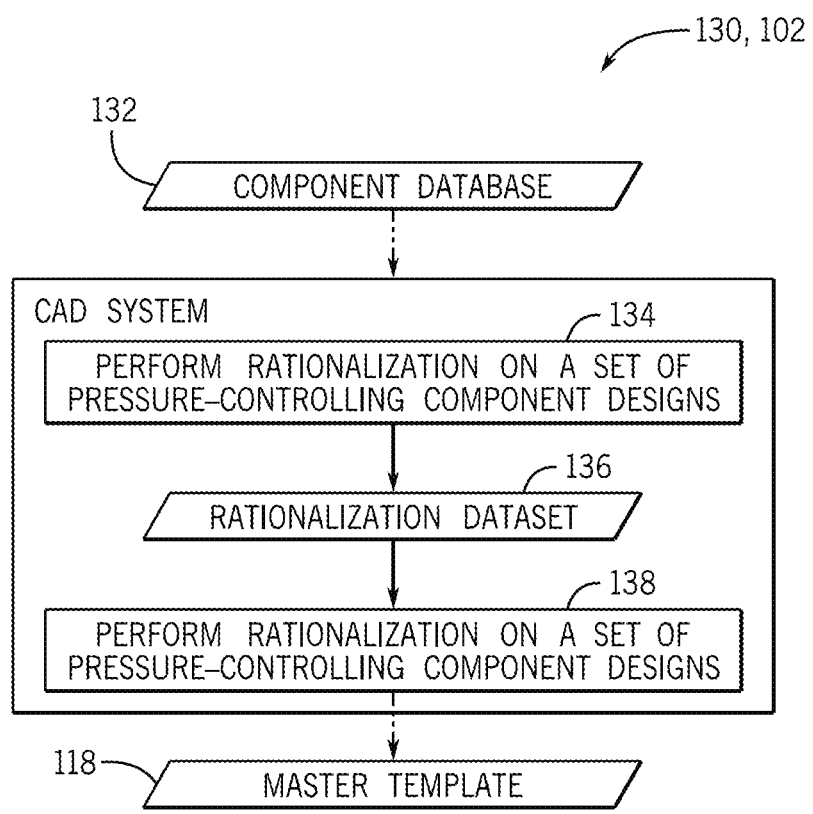
FIG. 6 is a flow diagram of a process whereby the CAD system of the MDO framework generates a master template as part of the MDO workflow, in accordance with an embodiment of the present disclosure.

FIG. 6 is a flow diagram illustrating an embodiment of a master template generation process 130 whereby the CAD system 106 of the MDO framework 100 generates the master template 118 as part of the MDO workflow 102. In certain embodiments, the CAD system 106 receives or accesses a component or product database 132 that stores properties (e.g., material properties; geometries; dimensions) of pressure-controlling components (e.g., ram 50). For the illustrated embodiment, the CAD system 106 first performs (block 134) rationalization on a set of pressure-controlling component designs from the component database 132 to generate a rationalization dataset 136. As used herein, "rationalization" refers to the process of grouping similar components into families by comparing their standard feature geometries (e.g., dimensions; tolerances; surfaces). The resulting rationalization dataset 136 serves as an information database for a number of existing and/or theoretical components, highlighting the common features shared between them, and defining ranges of parameter values to explain variation in the size and configuration of those features.

For the illustrated embodiment, the master template generation process 130 continues with the CAD system 106 performing parameterization (block 138), based on the rationalization dataset, to generate the master template 118. As used herein, "parameterization" refers to the process of identifying and classifying all relevant parameters of the designs to be represented by the master template 118. For example, for the ram 50 discussed above with respect to FIG. 3, these parameters may include different lengths 85 along the axis 32, different thicknesses 86 and 88 of portions of the leading surface 70, different angles 90, 92, or 94 between portions of the leading surface 70, different distances 96 around (e.g., partial circumference of) the curved portions 77, and so forth. In certain embodiments, each of these parameter values may be classified by a designer as being either fixed, logic driven (e.g., via equations), or direct user inputs. As such, the resulting master template 118 is a parameterized, three-dimensional CAD model in which these parameter values are determined based on the classification of each parameter.

FEA Modeling

Figure 7:
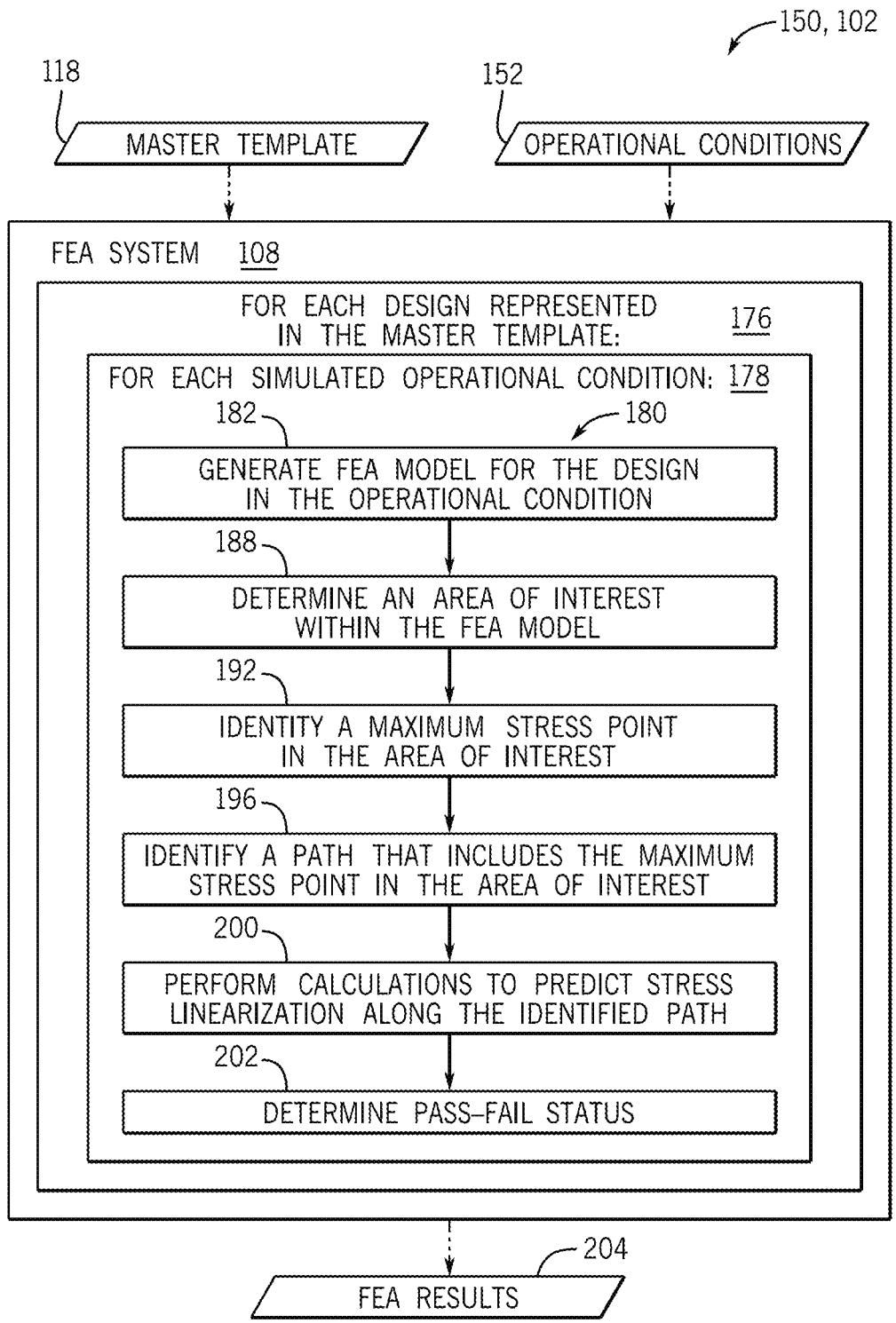
FIG. 7 is a flow diagram of a process whereby the FEA system of the MDO framework performs FEA modeling of the designs represented within the master template as part of the MDO workflow, in accordance with an embodiment of the present disclosure.

FIG. 7 is a flow diagram illustrating an embodiment of a FEA modeling process 150 whereby the FEA system 108 of the MDO framework 100 performs FEA modeling of the designs represented within the master template 118 as part of the MDO workflow 102. For the illustrated embodiment, the FEA system 108 receives the master template 118 from the MDO system 104 that includes a set of pressure-controlling component designs. The FEA system 108 also receives or accesses operational conditions 152 that define parameter values describing one or more conditions in which the operation of the pressure-controlling component designs will be simulated. In certain embodiments, the operational conditions 152 may be defined by a designer and provided as inputs to the MDO workflow 102 and/or the FEA modeling process 150.

In certain embodiments, when performing FEA modeling of the pipe ram 50, the ram 50 may be modeled in three different operational conditions 152: (1) hang-off loading; (2) opening; and (3) closed, locked, and vented (at maximum wellbore pressure). For each of these operational conditions 152, FEA system 108 may be configured to only model components of interest and to simulate the interactions with other components as boundary conditions, which simplifies FEA models. It may be appreciated that, when the pressure-controlling component is not a pipe ram, such as a shear ram, other operational conditions may be selected for FEA modeling, in accordance with the present disclosure.

Figure 8A:
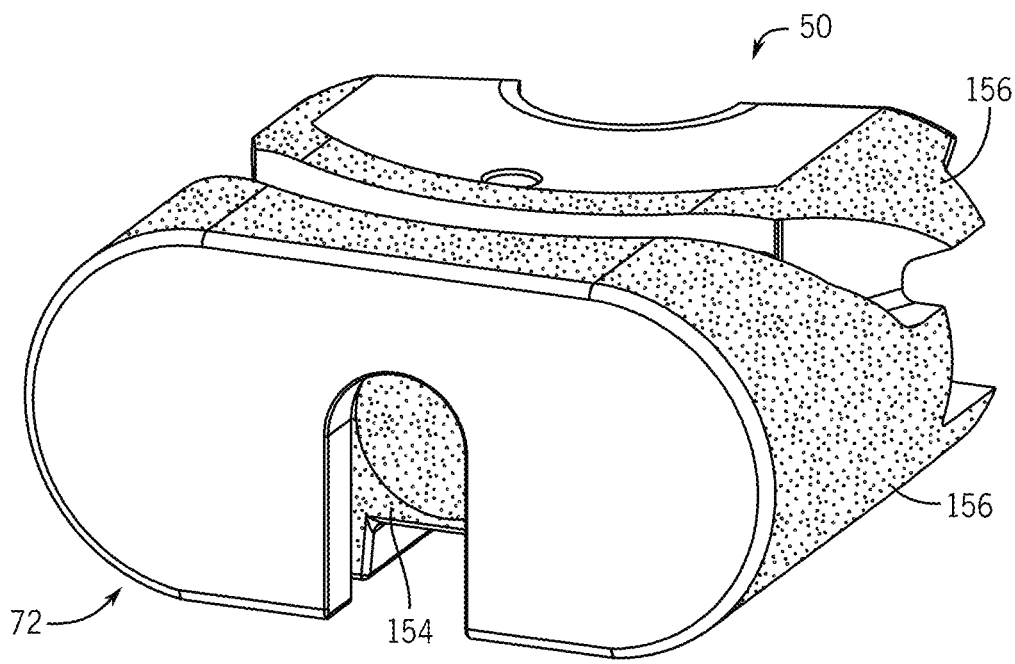
FIGS. 8A, 8B, and 9 illustrate loading and boundary conditions during FEA simulation of a pressure-controlling component in a first operational condition, specifically a pipe ram during hang-off loading, in accordance with an embodiment of the present disclosure.
Figure 8B:
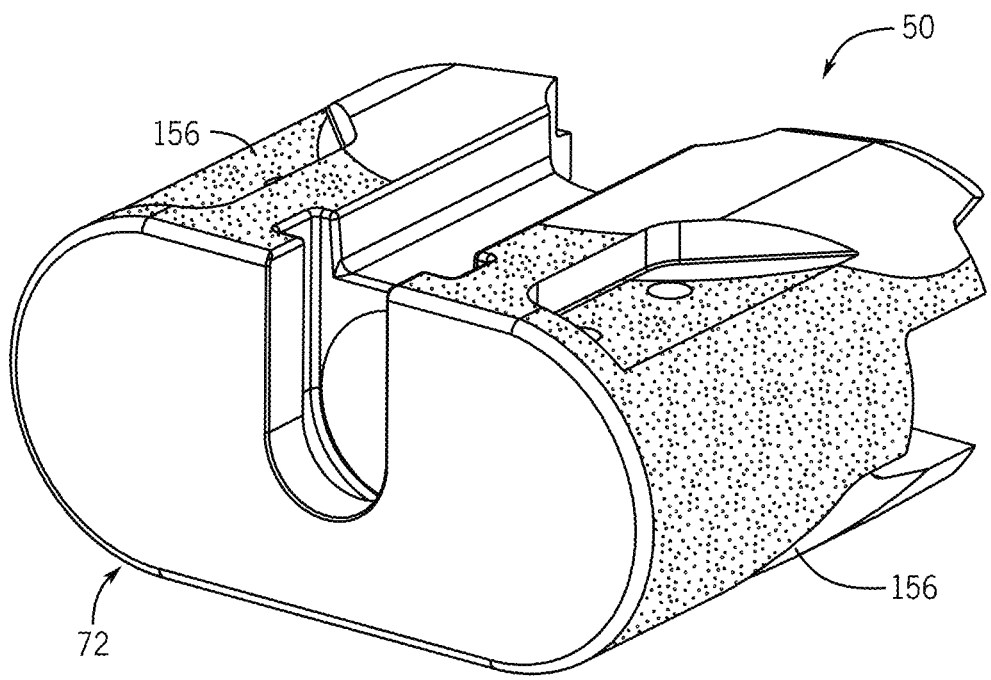
Figure 9:
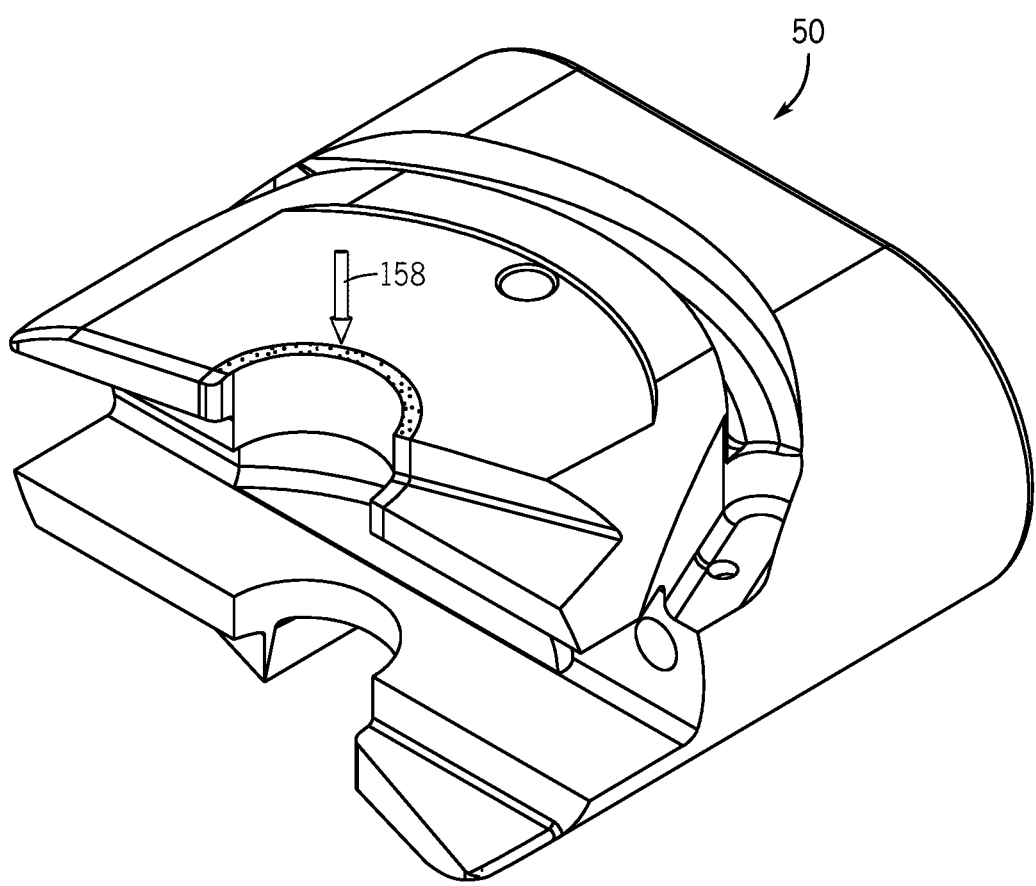

For example, the hang-off loading operational condition corresponds to the rams 50 of the BOP 24 in a closed position, and a conduit 20 hanging from the top of the rams 50. FIGS. 8A, 8B, and 9 illustrate loading and boundary conditions during FEA modeling of a ram 50 in a hang-off loading operational condition. More specifically, in the hang-off loading operational condition represented in FIG. 8A, a first boundary condition (e.g., a compression only support) is applied that creates a frictionless contact with a rigid surface where the connecting rod 66 comes in contact with the area on the rearward surface 72 of the ram 50, as indicated by the shaded region 154. As illustrated in FIGS. 8A and 8B, another boundary condition (e.g., another compression only support) is applied to the portion of the outer surfaces of the ram 50 that are in contact with the ram cavity of the BOP body, as indicated by the shaded regions 156. Additionally, as illustrated in FIG. 9, a force in the vertical direction is applied to the ram 50 to represent the load from the conduit 20, as indicated by the arrow 158. It may be appreciated that rams 50 may be rated for a variety of maximum hang-off loads depending on the size of the conduit 20.

Figure 10A:
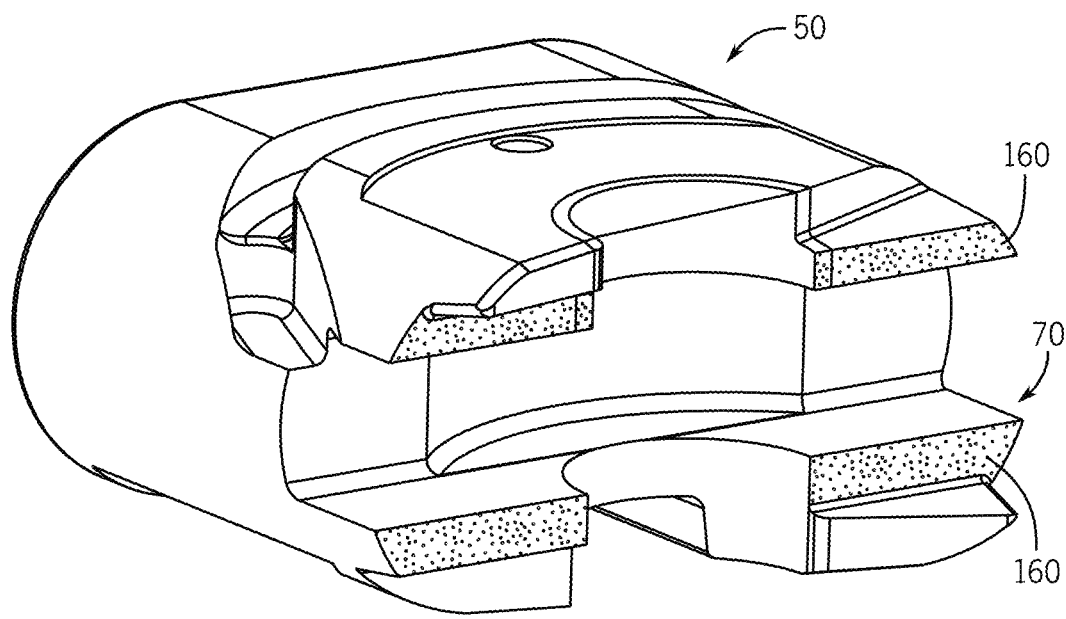
FIGS. 10A and 10B illustrate loading and boundary conditions during FEA simulation of the pressure-controlling component in a second operational condition, specifically the pipe ram during opening, in accordance with an embodiment of the present disclosure.
Figure 10B:
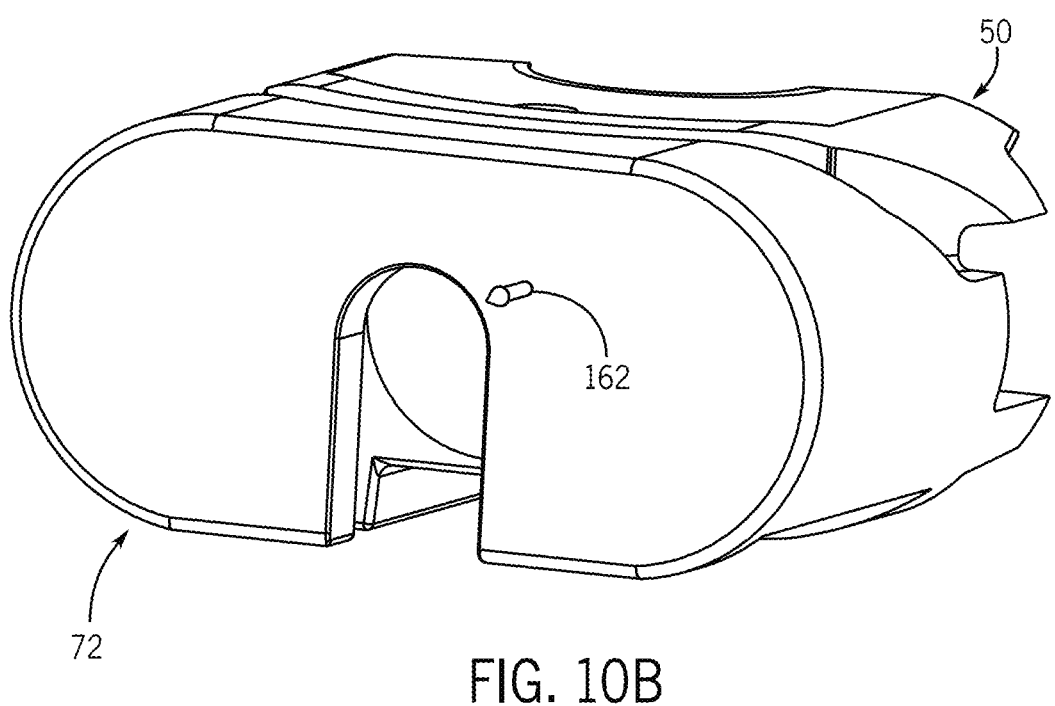

The opening operational condition corresponds to the rams 50 of the BOP 24 being opened with a particular pressure (e.g., 3,000 pounds per square inch) after previously closing and possibly being seized. FIGS. 10A and 10B illustrate loading and boundary conditions during FEA modeling of the pressure-controlling component in the opening operational condition. More specifically, in the opening operational condition represented in FIG. 10A, a first boundary condition (e.g., a fixed support constraining all degrees of freedom) is applied to the leading surface 70 of the rams 50, as indicated by the shaded regions 160. Additionally, a retracting force is applied the at the point where the connecting rod 66 comes in contact with the rearward surface 72 of the ram 50, as indicated by the arrow 162 of FIG. 10B.

Figure 11A:
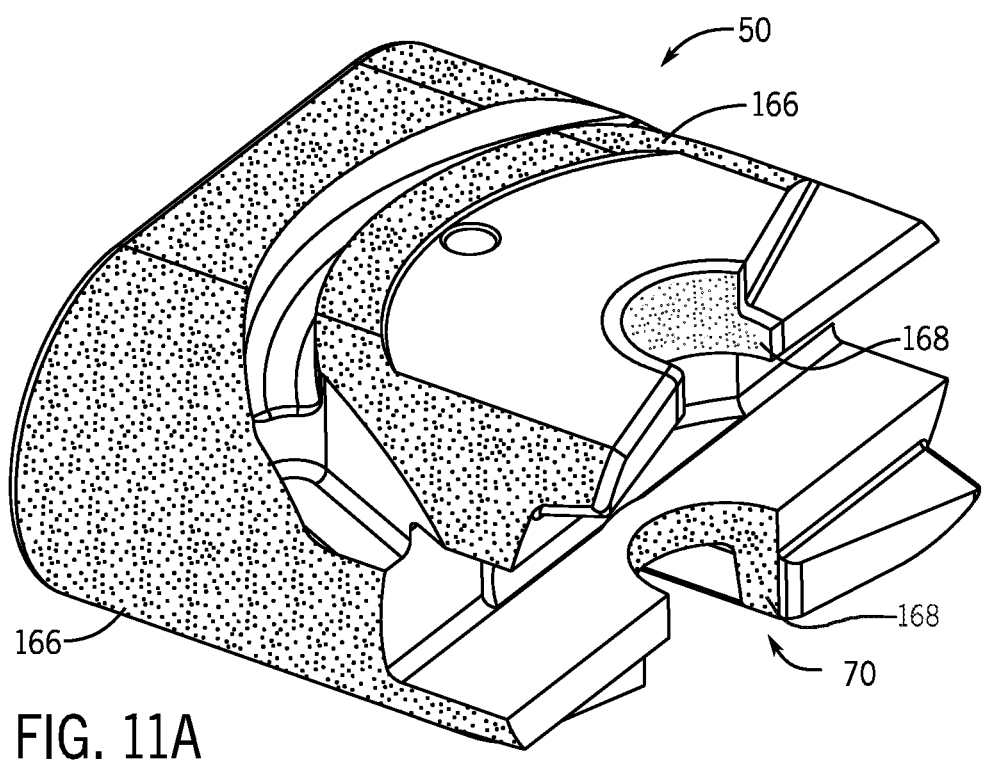
FIGS. 11A, 11B, 12A and 12B illustrate loading and boundary conditions during FEA simulation of the pressure-controlling component in a third operational condition, specifically the pipe ram under maximum wellbore pressure, closed, locked, and vented, in accordance with an embodiment of the present disclosure.
Figure 11B:
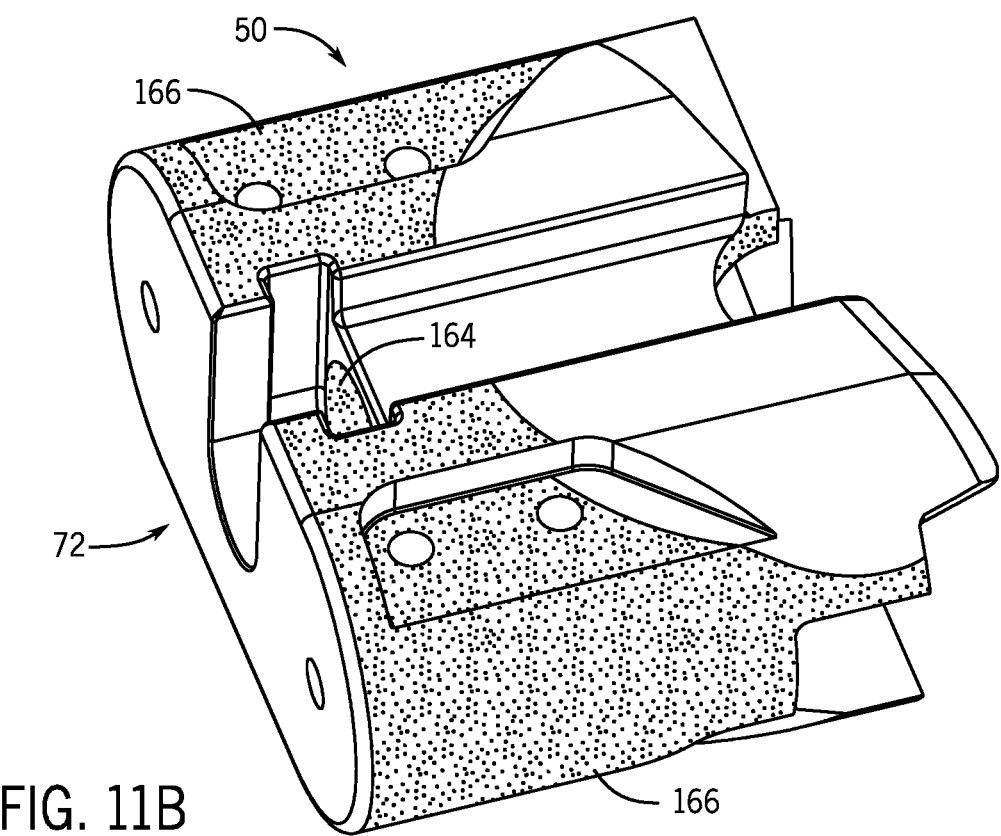
Figure 12A:
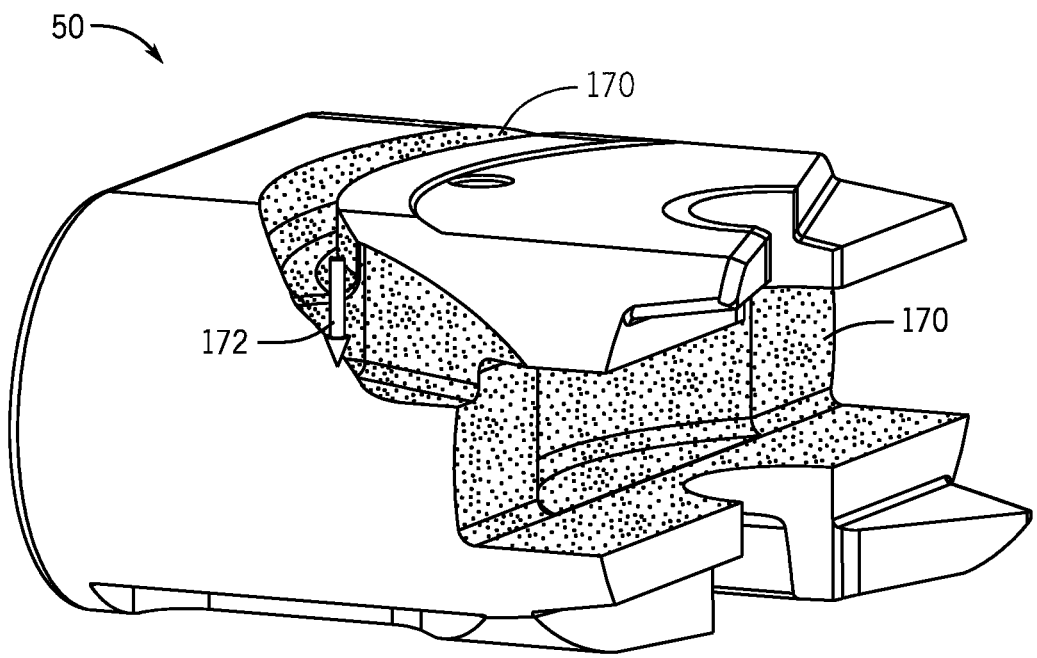
Figure 12B:
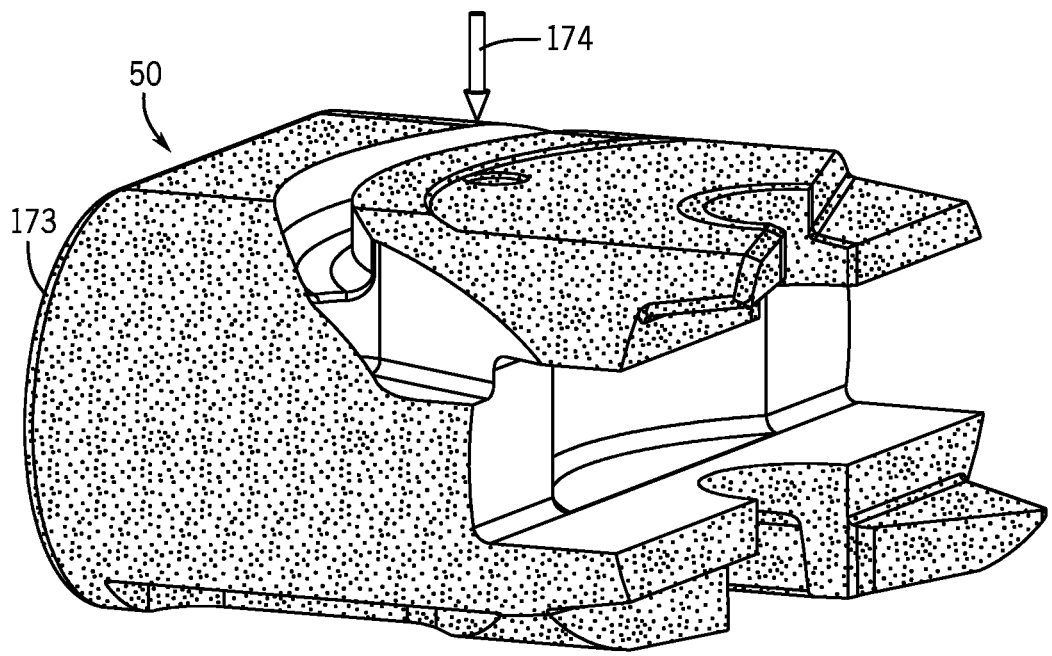

The closed, locked, and vented operational condition corresponds to the rams 50 of the BOP 24 being in the closed position, the locking mechanism on the bonnet assemblies 60 engaged, and the closing pressure vented from the bonnet assemblies. FIGS. 11A, 11B, 12A and 12B illustrate loading and boundary conditions during FEA simulation of the ram 50 in the closed, locked, and vented operational condition. More specifically, as illustrated in FIG. 11B, a first boundary condition (e.g., a compression only support) is applied that creates a frictionless contact with a rigid surface where the connecting rod 66 comes in contact with the area on the rearward surface 72 of the ram 50, as indicated by the shaded region 164. As illustrated in FIG. 11A, a second boundary condition (e.g., another compression only support) is applied to the outer surface of the ram 50 that is in contact with the ram cavity of the BOP body, as indicated by the shaded regions 166. As illustrated in FIG. 11A, a third boundary condition (e.g., another compression only support) is applied to the leading surface 70 of the ram 50 that contacts the conduit 20, as indicated by the shaded regions 168. Additionally, a pressure produced by elastomer seals of the ram 50 is applied to the surfaces of the ram 50 that are in contact with these seals, as indicated by the shaded regions 170 and the arrow 172 of FIG. 12A. Furthermore, the rams 50 are being subjected to a maximum wellbore pressure (e.g., 3,000 pounds per square inch), as indicated by the shaded regions 173 arrow 174 of FIG. 12B.

Returning to the FEA modeling process 150 of FIG. 7, the FEA system 108 performs a set of steps 180 for each design represented within the master template 118 (as indicated by the for-block 176) and for each of the operational conditions 152 (as indicated by the for-block 178). As such, the set of steps 180 is performed for each unique design/operational condition combination, such that the performance of each design represented within the master template 118 is simulated in each of the operational conditions 152. In certain embodiments, the FEA system 108 may be configured to perform the set of steps for each unique design/operational condition combination in parallel for enhanced efficiency.

Figure 13:
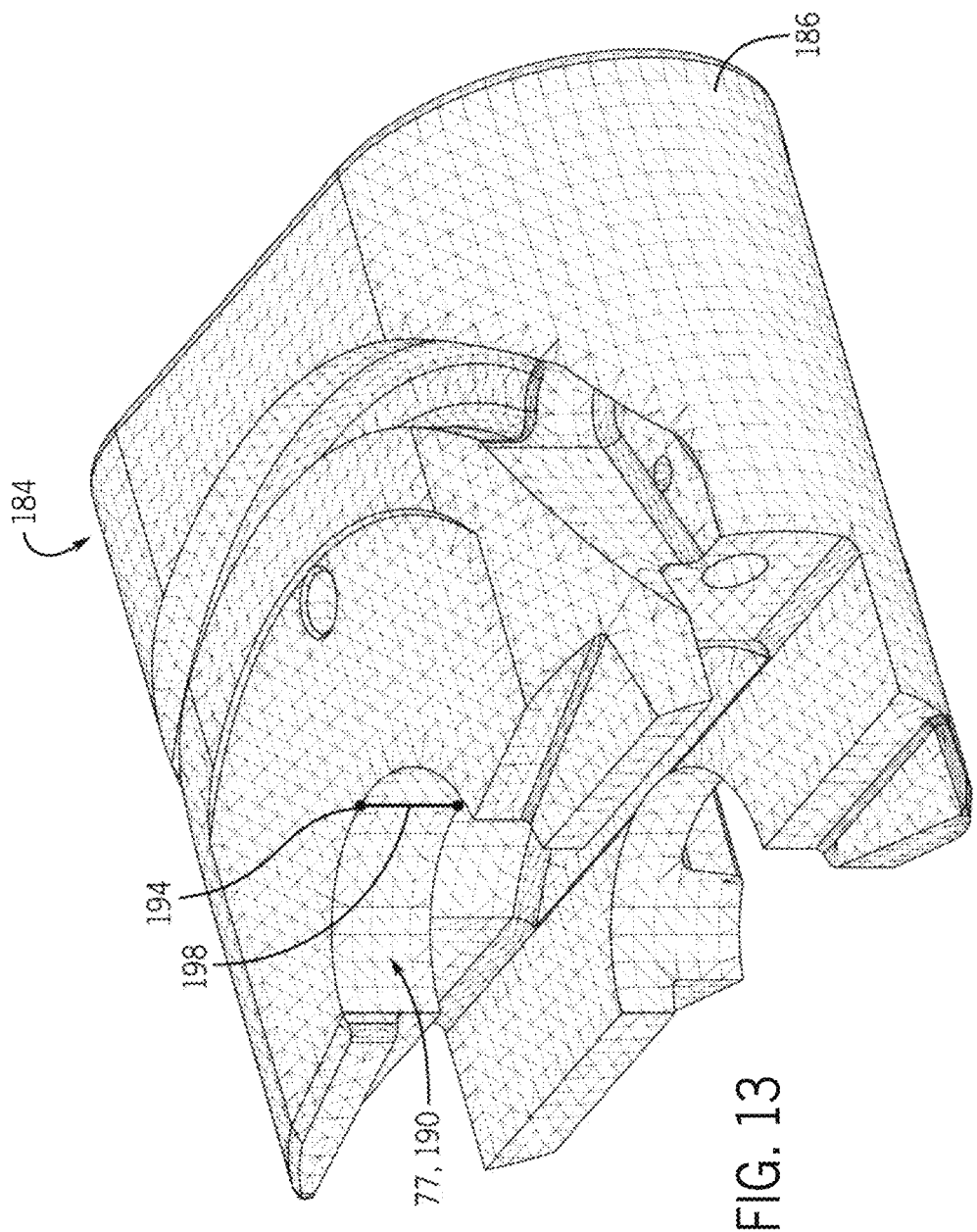
FIG. 13 is a representation of a portion of a FEA model generated by the FEA system for a pipe ram design, in accordance with an embodiment of the present disclosure.

For the embodiment of the FEA modeling process 150 illustrated in FIG. 7, the set of steps 180 begin with the FEA system 108 generating (block 182) a FEA model for a particular design in a particular operational condition. For example, FIG. 13 is a representation of a portion of a FEA model 184 generated by the FEA system 108 for a design of a ram 50. The illustrated FEA model 184 of the ram 50 in FIG. 13 is modeled as a fine mesh 186 with quadratic solid elements.

Returning to FIG. 7, the embodiment of the FEA modeling process 150 continues with the FEA system 108 determining (block 188) an area of interest within the FEA model 184. For example, in certain embodiments, a product subject-matter expert (SME) may identify an area of interest in the FEA model 184 for each of the operational conditions 152, which may be provided as an input to the FEA system 108 and/or FEA modeling process 150. For example, turning to FIG. 13, the FEA system 108 may receive an indication from the product SME an area of interest 190 for the hang-off loading operational condition corresponds to the area of the curved portion 77. In response to receiving this input, the FEA system 108 may automatically identify (block 192) a maximum stress point in the area of interest. For example, returning to FIG. 13, the FEA system 108 identifies the maximum stress point 194 in the area of interest 190.

The embodiment of the FEA modeling process 150 illustrated in FIG. 7 continues with the FEA system 108 identifying (block 196) a path that includes the maximum stress point 194. For example, as illustrated in FIG. 13, the FEA system 108 identifies the path 198 that includes the maximum stress point 194 in the area of interest 190. Returning to FIG. 7, the FEA system 108 performs (block 200) calculations to predict stress linearization (e.g., membrane stress, bending stress, total stress) along the path 198. Finally, the FEA system 108 determines (block 202) a pass-fail status for the design in the operational condition, based on the stress linearization calculation and one or more standards related to the pressure-controlling component.

In certain embodiments, stress calculations may be performed in accordance with the stress linearization analysis per the ASME and/or API standards set forth above. For example, in certain embodiments, the stress distribution calculation defined by the ASME BPVC standard may be used to calculate the membrane and bending components based on equations 1-4. The membrane stress tensor is the tensor comprised of the average of each stress component along the stress classification line (e.g., path 198) according to equation 1:

$$\sigma_{ij}^m = \frac{1}{t}\int_0^t \sigma_{ij} dx_S \qquad \text{Eq. 1}$$

where $\sigma_{ij}^m$, $t$, $\sigma_{ij}$ and $x_s$ represent the membrane stress tensor, the thickness of the section, the stress tensor along the path, and the coordinate along the path, respectively. The bending stress tensor is comprised of the linear varying portion of each stress component along the stress classification line according to equation 2:

$$\sigma_{ij}^b = \frac{6}{t^2}\int_0^t \sigma_{ij}\left(\frac{t}{2} - x\right) dx_S \qquad \text{Eq. 2}$$

where $\sigma_{ij}^b$, $t$, $\sigma_{ij}$ and $x_s$ represent the bending stress tensor, the thickness of the section, the stress tensor along the path, and the coordinate along the path, respectively. The allowable stresses are determined using equations 3 and 4:

$$S_m = \tfrac{2}{3} S_y \qquad \text{Eq. 3}$$

$$S_e = S_y \qquad \text{Eq. 4}$$

where $S_m$ is the design stress intensity, $S_y$ is minimum yield strength of the material, and $S_e$ is the maximum allowable equivalent stress.

To perform the calculations, the FEA system 108 may use certain materials property values of the pressure-controlling component and/or certain values (e.g., limits) defined by the ASME and/or API standards. For example, for an embodiment of the pipe ram 50, a minimum yield strength of the material is 90 kilopounds per square inch (ksi), the allowable membrane stress is 60 ksi, and the allowable sum of membrane stress and bending stresses is 90 ksi. In certain embodiments, these calculations may be implemented using a parametric design language associated with the FEA system 108. The FEA results 204 for all the designs of the master template 118 in each of the operational conditions can be compared to the aforementioned allowable stresses to determine compliance, as indicated by the pass-fail status. As noted above, in certain embodiments, the FEA results 204 are immediately provided to the MDO system 104 as each design and operational condition combination are simulated.

DMS Modeling

Figure 14:
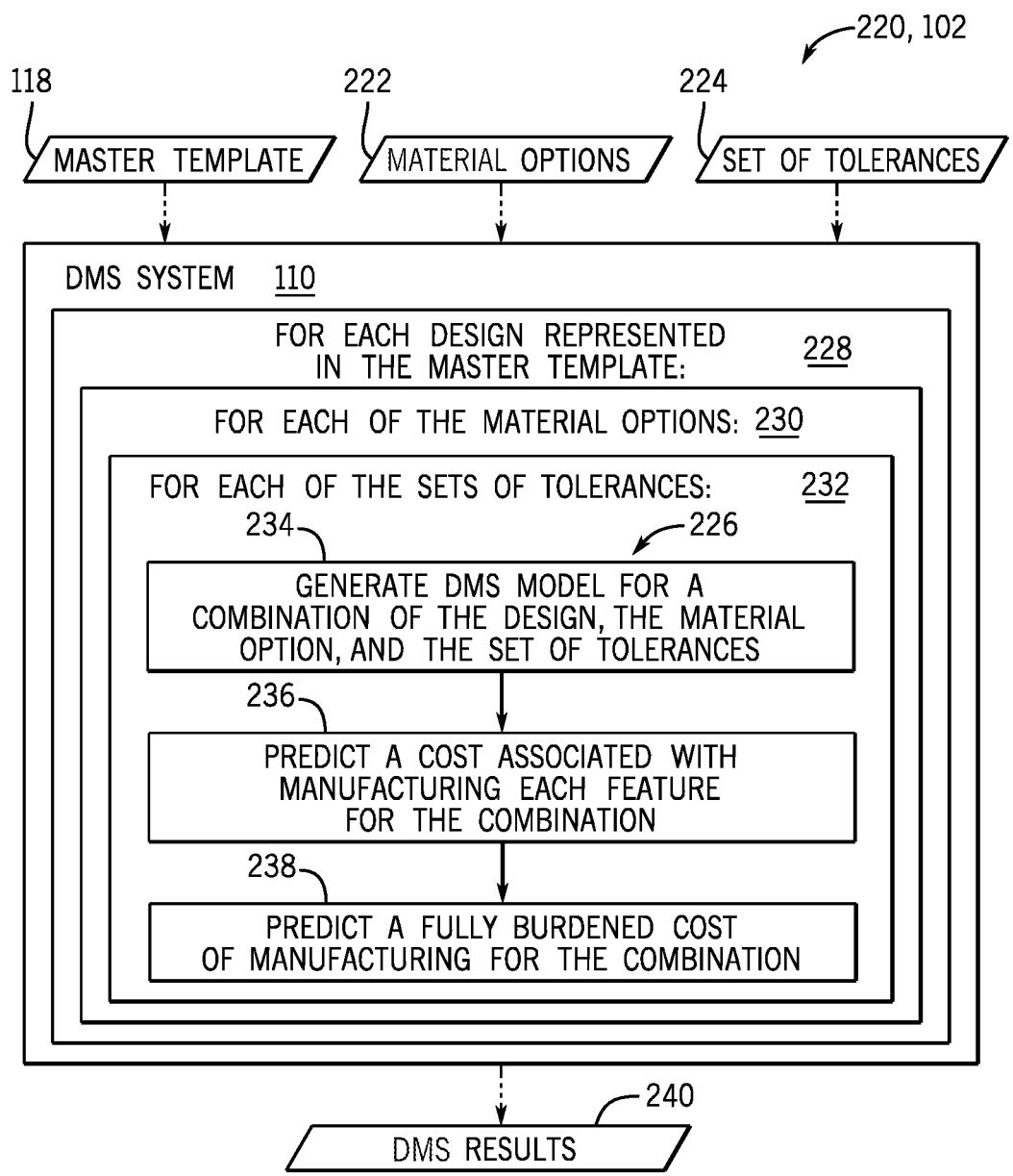
FIG. 14 is a flow diagram of a process whereby the DMS system of the MDO framework performs DMS modeling of the designs of the master template as part of the MDO workflow, in accordance with an embodiment of the present disclosure.

FIG. 14 is a flow diagram illustrating an embodiment of a DMS modeling process 220 whereby the DMS system of the MDO framework 100 performs DMS modeling of the designs represented within the master template 118 as part of the MDO workflow 102. For the illustrated embodiment, the DMS system 110 receives the master template 118 from the MDO system 104 that includes the set of pressure-controlling component designs. For the illustrated embodiment, the DMS system 110 also receives or accesses a set of material options 222, which is a dataset that defines different materials from which the pressure-controlling component may be manufactured, as well as information related to the cost of purchasing and machining the material in various manners. For the illustrated embodiment, the DMS system 110 also receives or accesses one or more sets of tolerances 224, wherein each set dictates a tolerances of each parametrized feature of the pressure-controlling component in the master template 118. It may be appreciated that, in some embodiments, the DMS system 110 may receive or access other information, such as product or material inventory information, or information related to labor or other overhead costs, to perform DMS modeling of the designs represented within the master template 118.

For the embodiment of the DMS modeling process 220 illustrated in FIG. 14, the DMS system 110 performs a set of steps 226 for each design represented within the master template 118 (as indicated by the for-block 228), for each of the material options 222 (as indicated by the for-block 230), and for each of the sets of tolerances 224 (as indicated by the for-block 232). As such, the set of steps 226 is performed for each unique combination of a design, a material option, and a set of tolerances, such that the manufacturability and cost of each combination or permutation can be modeled and predicted. In certain embodiments, the DMS system 110 can perform the set of steps 226 for each combination in parallel for enhanced efficiency.

For the embodiment of the DMS modeling process 220 illustrated in FIG. 14, these steps 226 include the DMS system 110 generating (block 234) a DMS model for a combination of a particular design of the master template 118, a particular material option of the material options 222, and particular set of tolerances of the sets of tolerances 224. The DMS system 110 may then simulate manufacturing of the combination using this DMS model to predict (block 236) a cost associated with manufacturing each feature (e.g., each geometric feature or design feature) of the combination. Subsequently, the DMS system 110 may combine information regarding the cost associated with the particular material option with the predicted costs determined in block 236 to predict (block 238) a fully burdened cost of manufacturing for the particular combination. As noted above, in certain embodiments, the DMS results 240 are immediately provided to the MDO system 104 as each combination is simulated.

Report Generation

Figure 15:
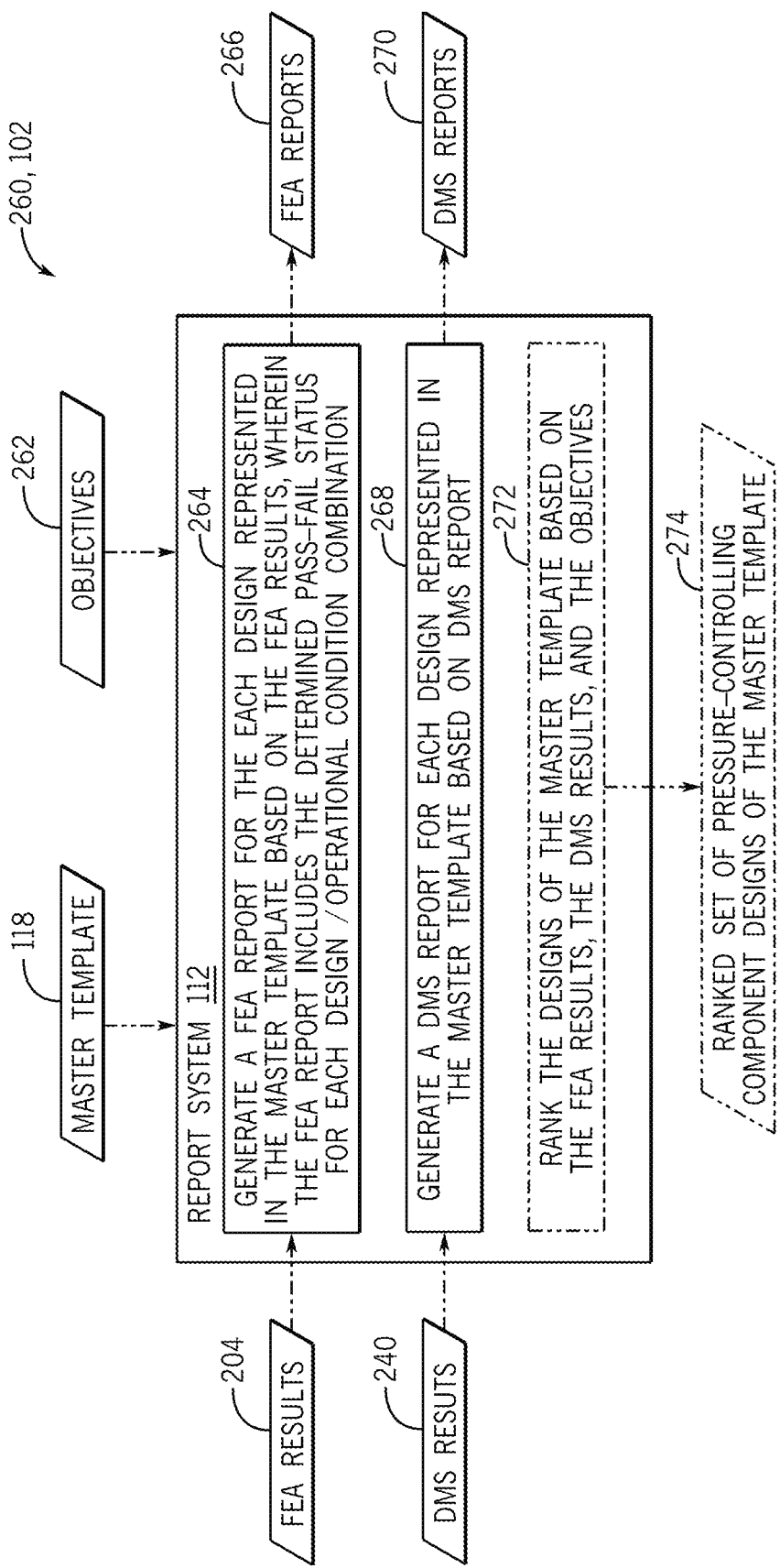
FIG. 15 is a flow diagram of a process whereby the report system of the MDO framework generates reports based on FEA and DMS modeling results determined for each of the designs represented within the master template as part of the MDO workflow, in accordance with an embodiment of the present disclosure.

FIG. 15 is a flow diagram illustrating an embodiment of a report generation process 260 whereby the report system 112 of the MDO framework 100 generates reports based on the FEA and DMS results for each of the designs represented within the master template 118 as part of the MDO workflow 102. For the illustrated embodiment, the DMS system 110 receives the master template 118 from the MDO system 104 that includes the set of pressure-controlling component designs. In certain embodiments, the FEA system 108 also receives or accesses a set of objectives 262 (e.g., design objectives), which define one or more goals to be achieved with respect to the manufacturing of the pressure-controlling component. For example, a non-limiting set of example objectives includes: maximizing compliance with one or more standards (e.g., maximizing positive pass-fail statuses), minimizing materials costs, minimizing manufacturing costs, maximizing operational lifetime, or any combination thereof.

The report system 112 also receives, from the MDO system 104, the FEA results 204 generated from the FEA modeling, as well as the DMS results generated from the DMS modeling, of the designs represented within the master template 118. For the illustrated embodiment, the report system 112 generates (block 264) a respective FEA report for each design represented within the master template 118, wherein the FEA reports 266 includes the determined pass-fail status for each of the designs and operational conditions 152 simulated during FEA modeling. For the illustrated embodiment, the report system 112 also generates (block 268) a respective DMS report for each design represented within the master template 118 to yield the DMS reports 270. In other embodiments, the report system 112 may generate a single FEA report and/or a single DMS report that includes results for all of the designs represented within the master template 118, or a single master report that includes both the FEA and DMS modeling results for all of the designs represented within the master template 118. For enhanced efficiency, the report system 112 may be configured to automatically begin generating each of the FEA reports 266 and/or DMS reports 270 as each result is received from the MDO system 104.

In certain embodiments, when the master template 118 includes a number of alternative designs being compared, the report system 112 may also rank (block 272) the designs of the master template based on the FEA results 204, the DMS results 240, and the objectives 262. For example, the objectives 262 may include maximizing compliance with one or more standards and minimizing manufacturing costs. As such, the report system 112 may first rank or order the designs of the master template 118 based on a greatest number of positive pass-fail statuses for the different simulated operational conditions during FEA modeling. In some embodiments, the report system 112 may remove designs from the ranking when the design is not associated with all positive pass-fail statuses. The report system 112 may then further rank or order the designs of the master template 118 based on the fully burdened manufacturing costs, wherein the lowest costs receive a higher ranking. In certain embodiments, the report system 112 may provide the ranked set 274 of pressure-controlling component designs as an output of the MDO workflow 102. As such, the MDO workflow 102 enables automatic optimization of designs, enabling designers to quickly eliminate inferior or costly designs and home in on designs that are optimized for performance and/or manufacturability.

Figure 16:
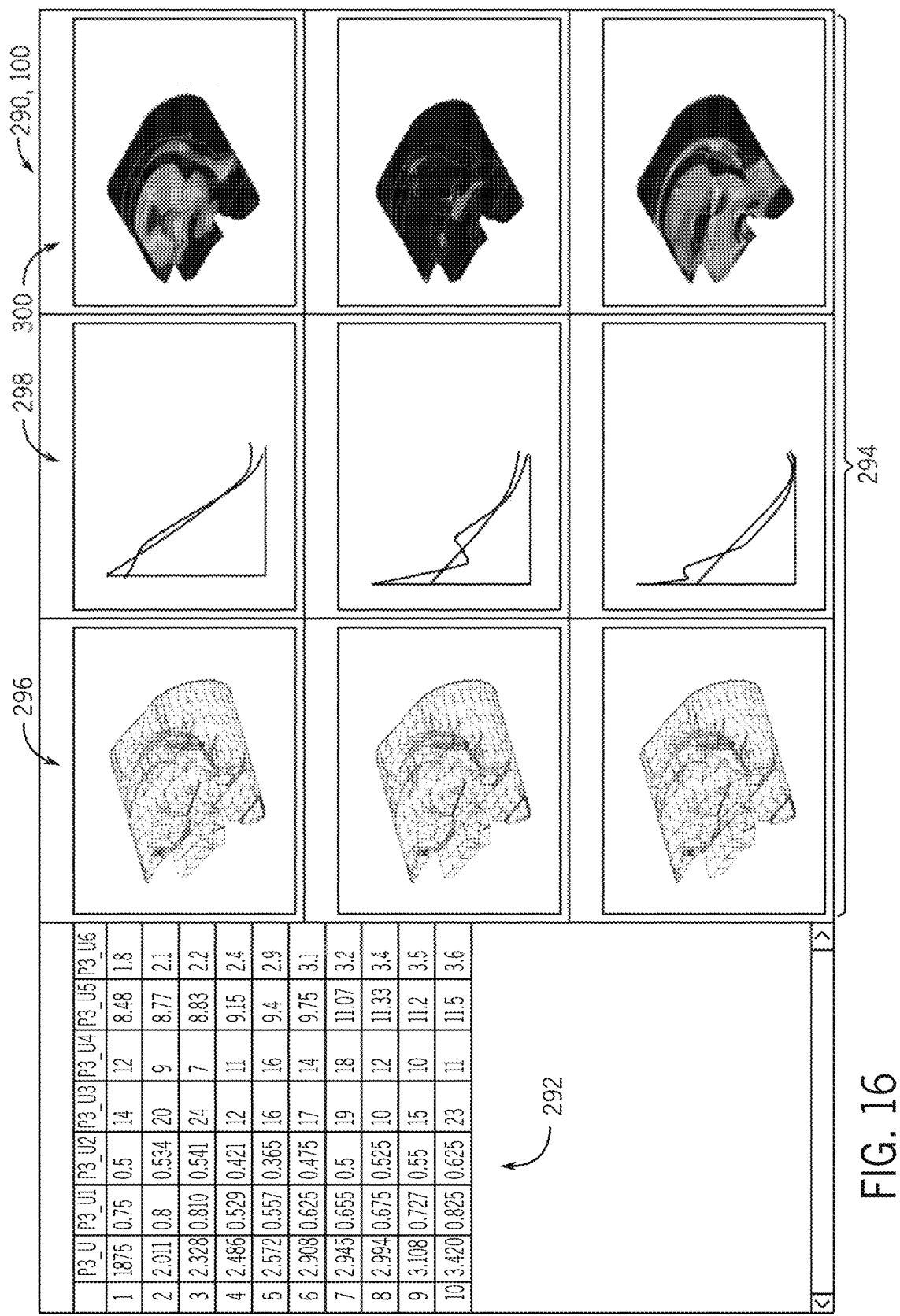
FIG. 16 is a graphical user interface (GUI) of the MDO framework that presents parameters and results of FEA modeling, under various operational conditions, for a set of pipe ram designs represented within the master template, in accordance with an embodiment of the present disclosure.

FIG. 16 illustrates an embodiment of a graphical user interface (GUI) 290 of the MDO framework 100 that presents parameters and results of FEA modeling, under various operational conditions, for a set of pipe ram designs represented within the master template 118. For the illustrated embodiment, the GUI 290 presents the FEA results 204 determined based on the FEA modeling process 150 of FIG. 7 for a master template 118 including ten designs of a product family of the ram 50. In some embodiments, the GUI 290 may be part of the report system 112, part of the FEA system 108, part of the MDO system 104, or distributed between one or more of these systems of the MDO framework 100.

For the embodiment illustrated in FIG. 16, the GUI 290 includes a table 292, wherein each row of the table corresponds to a design of the master template 118. Each column of the table 292 corresponds to a parameterized value of each design, such as different distances or angles that define the different geometries of the designs of the master template 118. The GUI 290 also includes a results section 294 that also includes columns and rows. Each of the three rows of the results section 294 corresponds to a different one of the three operational conditions 152 simulated for the pipe ram designs during FEA modeling, as discussed above. The left column 296 of the results section 294 illustrates portions of the FEA models 184 (e.g., the mesh of quadratic solid elements) that were generated for a particular design, which include the annotations discussed above with respect to FIG. 13. The middle column 298 of the results section 294 includes the stress linearization curves predicted for the particular design in each of the operational conditions based on the equations set forth above. The right column 300 of the results section 294 includes stress contour diagrams for each of the operational conditions, as determined during the FEA modeling process 150.

For the embodiment of the GUI 290 illustrated in FIG. 16, when a user selects a particular design (e.g., a particular row) of the table 292, then the results section 294 is updated to present the FEA models, the stress linearization curves, and the stress contour diagrams for the selected design in the three different operational conditions. As noted, once the master template 118 has been provided to the MDO system, as set forth above, the MDO workflow 102 may automatically produce the FEA reports 266, which include similar data as is presented by the GUI 290. In some embodiments, the GUI 290 may enable the conditions of the FEA modeling and the FEA results 204 to be directly viewed by the user, for example, before the FEA reports 266 are generated. In some embodiments, the GUI 290 may enable the user to modify one or more of the inputs or parameters to the FEA modeling process 150. In other embodiments, the GUI 290 may additionally or alternatively serve as a FEA report viewer to enable the user to review the FEA reports 266 and analyze the FEA results represented therein.

Figure 17:
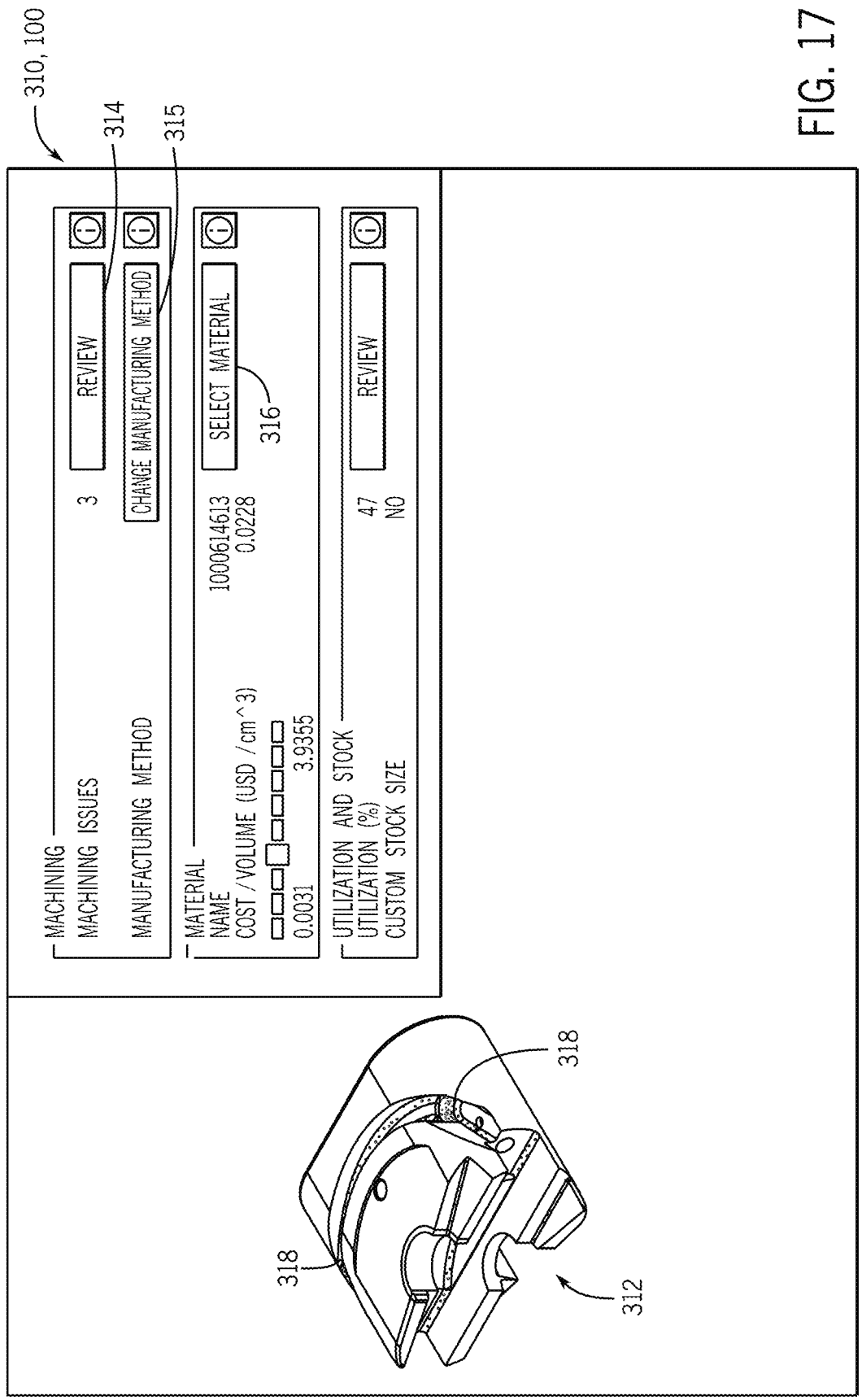
FIG. 17 is a GUI of the MDO framework that presents parameters and results of the DMS modeling for a product family of pipe ram designs represented within the master template, in accordance with an embodiment of the present disclosure.

FIG. 17 illustrates an embodiment of another GUI 310 of the MDO framework 100 that presents parameters and results of the DMS modeling for a product family of pipe ram designs represented within an example master template 118. For the illustrated embodiment, the GUI 310 presents DMS results 240 determined based on the DMS modeling process 220 of FIG. 14 for a master template 118 including a set of designs from a product family of the pipe ram 50. In some embodiments, the GUI 310 may be part of the report system 112, part of the DMS system 110, part of the MDO system 104, or distributed between one or more of these systems of the MDO framework 100. Additionally, in certain embodiments, the GUI 310 may be used to provide information (e.g., material options, tolerances) as inputs to the DMS modeling process 220.

For the embodiment illustrated in FIG. 17, the GUI 310 includes a CAD drawing 312 of the ram 50. The GUI 310 also includes a review button 314 that enables the user to review machining issues identified during the DMS modeling. The GUI 310 also includes a manufacturing method button 315 that enables the user to change the method of manufacturing (e.g., milling; additive manufacturing) applied during the DMS modeling. The GUI 310 also includes a select material button 316 that enables the user to select different material options 222 for manufacturing the ram 50. In some embodiments, the GUI 310 may include inputs to enable the user to select other information (e.g., sets of tolerances 224) that may be applied during DMS modeling.

For the embodiment illustrated in FIG. 17, the CAD drawing 312 of the ram 50 includes a number of different shaded regions 318. These shaded regions 318 of the CAD drawing 312 correspond to the top n (e.g., top five, top ten, top twenty) features that bear the highest manufacturing cost. It may be appreciated that, in certain embodiments, once the master template 118 has been provided, the MDO workflow 102 may automatically produce the DMS reports 270 discussed above, which include similar data as is presented by the GUI 310. In some embodiments, the GUI 310 may additionally or alternatively serve as a DMS report viewer to enable the user to review the DMS reports 270 and analyze the DMS results 240 represented therein. In some embodiments, the GUI 310 may enable the conditions of the DMS modeling and the DMS results 240 to be directly viewed by the user, for example, before the DMS reports 270 are generated. As such, in certain embodiments, the GUIs 290 and 310 may enable a user to perform "what-if" analyses for varying geometric features, dimensions, materials, and so forth, and eventually optimize for minimizing cost, or finding out the optimum tradeoff between cost and performance for the designs represented in the master template 118 as part of the MDO workflow 102.

Figure 18:
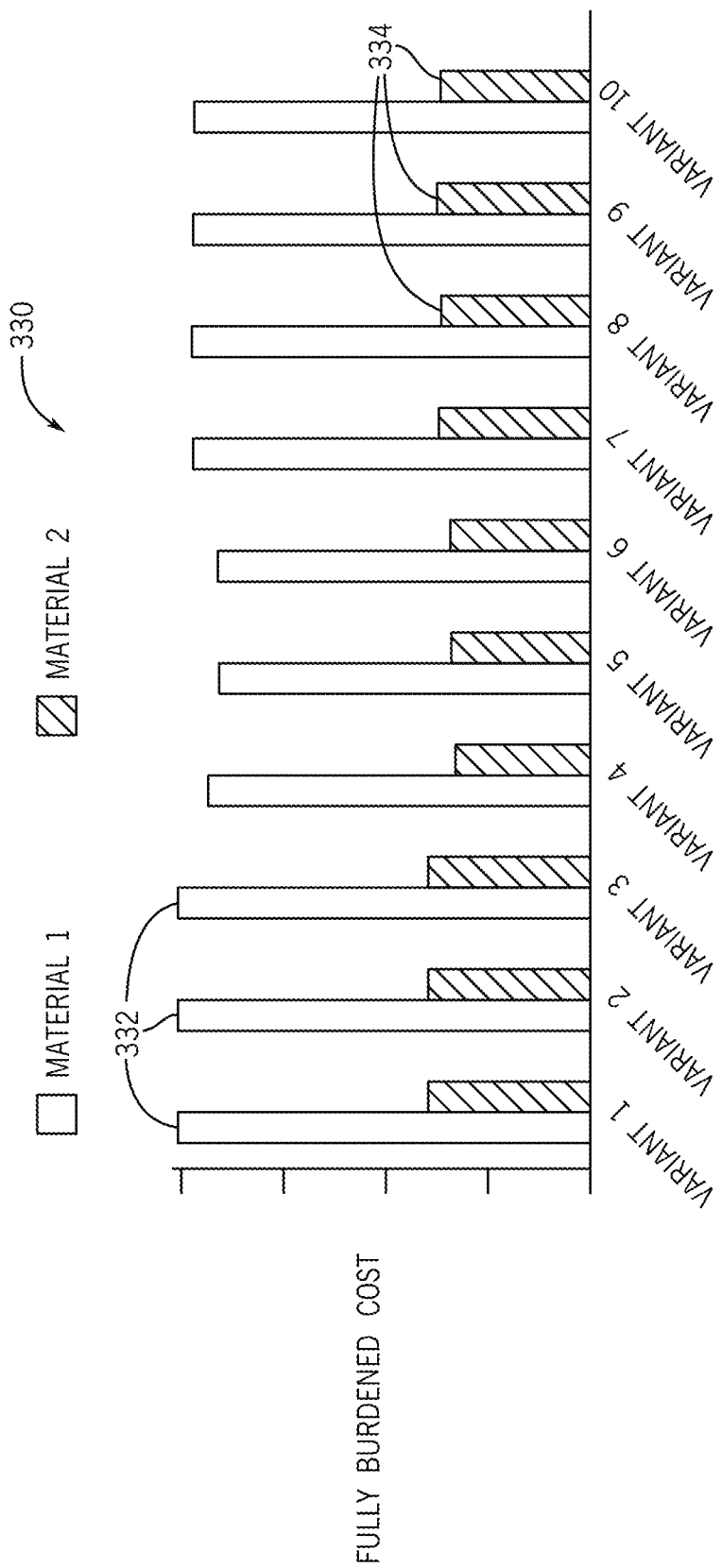
FIG. 18 is a bar graph illustrating a predicted fully burdened cost for manufacturing each design of a set of a pressure-controlling component designs using two different materials, as determined by the DMS modeling of the MDO workflow, in accordance with an embodiment of the present disclosure.

FIG. 18 is a bar graph 330 illustrating the predicted, relative, fully burdened cost for manufacturing each design of a set of a pressure-controlling component designs using two different materials, as determined by the DMS modeling process 220 of the MDO workflow 102 for an example master template 118. More specifically, the bar graph 330 includes entries for each of a set of 10 different alternative designs represented in the example master template 118. Each entry includes a first bar 332 that indicates a fully burdened cost of manufacturing each of the designs using a first, more expensive material, and a second bar 334 that indicates a fully burdened cost of manufacturing each of the design using a second, more cost-effective material. As noted, the bar graph 330 may be included as part of the DMS reports 270 generated by the report system 112 based on the DMS results 240. In certain embodiments, the report system 112 may consider the fully burden costs of manufacturing each design in the two different materials as part of determining a relative ranking of designs.

Figure 19:
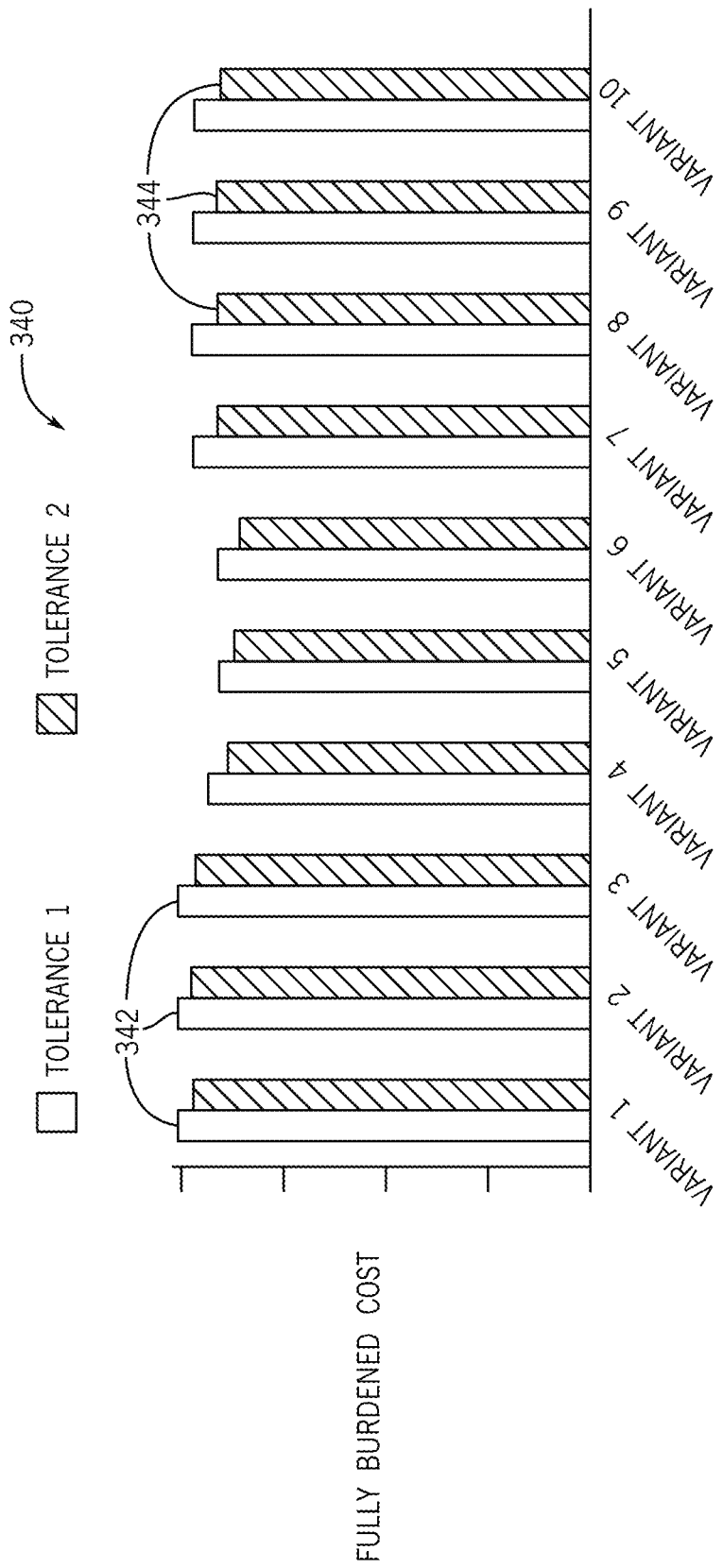
FIG. 19 is a bar graph illustrating a predicted fully burdened cost for manufacturing each design of a product family of a pressure-controlling component at two different tolerances, as determined by the DMS modeling of the MDO workflow, in accordance with an embodiment of the present disclosure.

FIG. 19 is a bar graph 340 illustrating the predicted, relative, fully burdened cost for manufacturing each design of a product family of a pressure-controlling component at two different tolerances, as determined by the DMS modeling process 220 of the MDO workflow 102. More specifically, the bar graph 340 includes entries for each of a set of 10 different designs of a product family represented in the example master template 118. Each entry includes a first bar 342 that indicates a fully burdened cost of manufacturing each of the designs using a first, more rigid set of tolerances, and a second bar 344 that indicates a fully burdened cost of manufacturing each of the design using a second, less rigid set of tolerances. In certain embodiments, the report system 112 may consider the fully burden costs of manufacturing each design at the different tolerances as part of determining a relative ranking of designs.

The disclosed techniques enable a multi-disciplinary optimization (MDO) workflow to facilitate analysis and optimization of set of designs of a pressure-controlling component. The MDO workflow generally enables design workflow integration and automation, which can improve engineering efficiency, and enables automated optimization within the workflow automation, which facilitates performance and reliability improvement for product development. The MDO workflow enables the integration of computer-aided design (CAD), finite element analysis (FEA), digital manufacturing simulation (DMS), and optimization packages to facilitate testing and optimization of a set of pressure-controlling component designs. As discussed, the MDO workflow enables automatic optimization of designs, enabling designers to quickly eliminate inferior or costly designs and home in on designs that are optimized for performance and/or manufacturability.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. A multi-disciplinary optimization (MDO) framework, comprising:
   at least one memory configured to store a computer-aided design (CAD) system, a finite element analysis (FEA) system, a digital manufacturing simulation (DMS) system, and a report system of the MDO framework; and
   at least one processor configured to execute stored instructions to cause the MDO framework to perform actions comprising:
   generating, via the CAD system, a master template that represents a set of designs of a pressure-controlling component;
   providing, to the DMS system, the master template, one or more operational conditions, one or more material options for manufacturing the pressure-controlling component, and one or more sets of tolerances for manufacturing the pressure-controlling component;
   performing, via the FEA system, FEA modeling to simulate and determine a pass-fail status for each design in the set of designs represented in the master template in each of the one or more operational conditions;
   performing, via the DMS system, DMS modeling to predict a cost of manufacturing each design in the set of designs represented in the master template using each of the one or more material options and each of the one or more sets of tolerances; and generating, via the report system, a FEA report for each design in the set of designs represented in the master template based on results from the FEA modeling, wherein each FEA report indicates the pass-fail status for a particular design in each of the one or more operational conditions; and determining a relative ranking for each design in the set of designs represented in the master template to provide a design review based on the results of the FEA modeling, based on results of the DMS modeling, and based on one or more objectives, wherein the one or more objectives comprise maximizing positive pass-fail indications, minimizing materials cost of the pressure-controlling component, minimizing manufacturing cost of the pressure-controlling component, or any combination thereof.

2. The MDO framework of claim 1, wherein, to generate the master template, the at least one processor is configured to execute the stored instructions to cause the MDO framework to perform actions comprising:

performing, via the CAD system, rationalization on the set of designs of the pressure-controlling component to generate a rationalization dataset; and performing, via the CAD system, parameterization of the master template based on the rationalization dataset.

3. The MDO framework of claim 1, wherein the pressure-controlling component is a pipe ram of a blowout preventer (BOP), and wherein the FEA system is configured to determine the pass-fail status based on stress requirements per the American Petroleum Institute (API) Specification 16A and American Society of Mechanical Engineers (ASME) Boiler and Pressure Vessel Code Section VIII, Division 2.

4. The MDO framework of claim 1, wherein the set of designs represented in the master template are alternative designs of the pressure-controlling component.

5. The MDO framework of claim 1, wherein the DMS system is configured generate a respective DMS model to predict the cost of manufacturing each design in the set of designs represented in the master template using each of the one or more material options and each of the one or more sets of tolerances.

6. The MDO framework of claim 1, wherein the set of designs represented in the master template are designs of a product family having similar features and having different dimensions, different geometries, or any combination thereof.

7. A method of operating a multi-disciplinary optimization (MDO) framework, comprising:

generating a master template that represents a set of designs of a pressure-controlling component;

determining operational conditions, materials options, and sets of tolerances of the pressure-controlling component;

performing FEA modeling to simulate and determine a pass-fail status for each design in the set of designs represented in the master template in each of the operational conditions;

performing DMS modeling to predict a cost of manufacturing each design in the set of designs represented in the master template using each of the material options and each of the sets of tolerances;

generating a FEA report for each design in the set of designs represented in the master template based on results from the FEA modeling, wherein each FEA report indicates the pass-fail status for a particular design in each of the operational conditions; and determining a relative ranking for each design in the set of designs represented in the master template to provide a design review based on the results of the FEA modeling, based on results of the DMS modeling, and based on one or more objectives, wherein the one or more objectives comprise maximizing positive pass-fail indications, minimizing materials cost of the pressure-controlling component, minimizing manufacturing cost of the pressure-controlling component, or any combination thereof.

8. The method of claim 7, wherein performing the FEA modeling comprises:

generating a respective FEA model to simulate each design in the set of designs represented in the master template in each of the operational conditions.

9. The method of claim 7, wherein performing the DMS modeling comprises:

generating a respective DMS model to predict the cost of manufacturing each design in the set of designs represented in the master template using each of the material options and each of the sets of tolerances.

10. The method of claim 7, further comprising:

generating a DMS report for each design in the set of designs represented in the master template based on the results from the DMS modeling, wherein each DMS report includes the predicted cost of manufacturing each design in the set of designs represented in the master template.

11. A non-transitory, computer-readable medium storing instructions of a multi-disciplinary optimization (MDO) framework executable by one or more processors of a computing system, the instructions comprising the instructions to:

generate a master template that represents a set of designs of a pressure-controlling component;

determine operational conditions, material options, and sets of tolerances of the pressure-controlling component;

perform FEA modeling to simulate and determine a pass-fail status for each design in the set of designs represented in the master template in each of the operational conditions;

perform DMS modeling to predict a cost of manufacturing each design in the set of designs represented in the master template using each of the material options and each of the sets of tolerances;

generate a FEA report for each design in the set of designs represented in the master template based on results from the FEA modeling, wherein each FEA report indicates the pass-fail status for a particular design in each of the operational conditions; and determine a relative ranking for each design in the set of designs represented in the master template to provide a design review based on the results of the FEA modeling, based on results of the DMS modeling, and based on one or more objectives, wherein the one or more objectives comprise maximizing compliance with one or more standards associated with the pressure-controlling component, minimizing materials cost of the pressure-controlling component, minimizing manufacturing cost of the pressure-controlling component, or any combination thereof.

12. The medium of claim 11, wherein the pass-fail status for each design in the set of designs represented in the master template in each of the operational conditions is determined based on results of FEA modeling stress requirements per the American Petroleum Institute (API) Specification 16A and American Society of Mechanical Engineers (ASME) Boiler and Pressure Vessel Code Section VIII, Division 2.

\* \* \* \* \*